United States Patent
Raghavan et al.

(10) Patent No.: US 11,800,389 B2
(45) Date of Patent: Oct. 24, 2023

(54) TECHNIQUES FOR BEAMFORMING ENHANCEMENT AND FEEDBACK

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 16/915,105

(22) Filed: Jun. 29, 2020

(65) Prior Publication Data
US 2021/0409989 A1  Dec. 30, 2021

(51) Int. Cl.
*H04W 24/10* (2009.01)
*H04W 72/044* (2023.01)
*H04W 16/28* (2009.01)
*H04W 24/08* (2009.01)

(52) U.S. Cl.
CPC .......... *H04W 24/10* (2013.01); *H04W 16/28* (2013.01); *H04W 24/08* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2013/0343303 A1* | 12/2013 | Kim | H04B 7/0639 370/329 |
| 2016/0028451 A1* | 1/2016 | Hu | H01Q 1/246 370/329 |
| 2016/0029225 A1* | 1/2016 | Hu | H04B 1/40 455/562.1 |
| 2018/0278310 A1* | 9/2018 | Lee | H04B 7/0632 |
| 2018/0279151 A1* | 9/2018 | Tseng | H04W 24/08 |
| 2019/0069285 A1* | 2/2019 | Chandrasekhar | H04B 7/088 |
| 2019/0313393 A1* | 10/2019 | Wang | H04B 17/309 |
| 2019/0339378 A1* | 11/2019 | Zwirn | G01S 13/878 |
| 2020/0395999 A1* | 12/2020 | Diaz Sendra | H04B 7/1853 |

* cited by examiner

*Primary Examiner* — Chi H Pham
*Assistant Examiner* — Raul Rivas
(74) *Attorney, Agent, or Firm* — Holland & Hart LLP

(57) ABSTRACT

Methods, systems, and devices for wireless communications are described. A user equipment (UE) may be configured to measure and report a beam combination parameter to a base station to improve generation of a dynamic beam for beamformed communications. In some examples, the UE may measure the beam combination parameter in terms of angular spread/coverage area of individual beams, array or signal gains at antennas or panels of the UE, additional panel/antenna module related information, etc. Based on the reported beam combination, the base station may generate the dynamic beam and indicate a beam configuration to the UE for subsequent communications. In some examples, distinct beam combination parameters may be reported for each component carrier or subband in a carrier aggregation (CA) configuration (e.g., inter-band CA or intra-band CA).

30 Claims, 17 Drawing Sheets

TECHNIQUES FOR BEAMFORMING ENHANCEMENT AND FEEDBACK

FIELD OF TECHNOLOGY

The following relates generally to wireless communications and more specifically to techniques for beamforming enhancement and feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to communicate with a base station using beamformed transmissions. However, for some use cases, conventional beamforming techniques may be deficient or sub-optimal in some current configurations.

SUMMARY

The described techniques relate to improved methods, systems, devices, and apparatuses that support techniques for beamforming enhancement and feedback. Generally, the described techniques provide for configuring a user equipment (UE) to measure and report a beam combination parameter to a base station to improve generation of a dynamic beam (which may be referred to as a multi-beam, a multi-lobe beam, a beam with multiple signal energy peaks, etc.) for beamformed communications. In some examples, the UE may measure the beam combination parameter in terms of angular spread/coverage area of individual beams, array or signal gains at antenna modules or panels of the UE, additional panel/antenna module related information, etc. Based on the reported beam combination, the base station may generate the dynamic beam and indicate a beam configuration to the UE for subsequent communications. In some examples, distinct beam combination parameters may be reported for each component carrier or subband in a carrier aggregation (CA) configuration (e.g., inter-band CA or intra-band CA, either in a frequency range or in multiple frequency ranges).

A method of wireless communications at a UE is described. The method may include determining a set of beams configured for communications between the UE and a base station based on measuring a respective signal parameter corresponding to each beam in the set of beams, transmitting, to the base station, a report indicating a beam combination parameter that identifies a signal quality corresponding to a combination of a set of beams in the set of beams, receiving a beam configuration based on transmitting the report, where the beam configuration indicates a dynamic beam including one or more beams of the set of beams, and communicating with the base station via the dynamic beam based on receiving the beam configuration.

An apparatus for wireless communications at a UE is described. The apparatus may include a processor, memory coupled with the processor, and instructions stored in the memory. The instructions may be executable by the processor to cause the apparatus to determine a set of beams configured for communications between the UE and a base station based on measuring a respective signal parameter corresponding to each beam in the set of beams, transmit, to the base station, a report indicating a beam combination parameter that identifies a signal quality corresponding to a combination of a set of beams in the set of beams, receive a beam configuration based on transmitting the report, where the beam configuration indicates a dynamic beam including one or more beams of the set of beams, and communicate with the base station via the dynamic beam based on receiving the beam configuration.

Another apparatus for wireless communications at a UE is described. The apparatus may include means for determining a set of beams configured for communications between the UE and a base station based on measuring a respective signal parameter corresponding to each beam in the set of beams, transmitting, to the base station, a report indicating a beam combination parameter that identifies a signal quality corresponding to a combination of a set of beams in the set of beams, receiving a beam configuration based on transmitting the report, where the beam configuration indicates a dynamic beam including one or more beams of the set of beams, and communicating with the base station via the dynamic beam based on receiving the beam configuration.

A non-transitory computer-readable medium storing code for wireless communications at a UE is described. The code may include instructions executable by a processor to determine a set of beams configured for communications between the UE and a base station based on measuring a respective signal parameter corresponding to each beam in the set of beams, transmit, to the base station, a report indicating a beam combination parameter that identifies a signal quality corresponding to a combination of a set of beams in the set of beams, receive a beam configuration based on transmitting the report, where the beam configuration indicates a dynamic beam including one or more beams of the set of beams, and communicate with the base station via the dynamic beam based on receiving the beam configuration.

Some examples of the method, apparatuses, and non-transitory computer-readable medium described herein may further include operations, features, means, or instructions for determining a channel related beam parameter associated with the dynamic beam based on the beam configuration and the signal parameters corresponding to the one or more beams of the dynamic beam.

In some examples of the method, apparatuses, and non-transitory computer-readable medium described herein, the channel related beam parameter includes a power delay profile for the dynamic beam, a timing offset for the dynamic beam, a frequency offset for the dynamic beam, or any combination thereof.

Some examples of the method, apparatuses, and non-transitory computer-readable medium described herein may further include operations, features, means, or instructions for determining the beam combination parameter based on measuring the signal parameters.

In some examples of the method, apparatuses, and non-transitory computer-readable medium described herein, the beam combination parameter includes a respective angular spread of each beam of the set of beams, a respective coverage area of each beam of the set of beams, a respective array gain of each beam of the set of beams, a respective signal-to-noise ratio gain of each beam of the set of beams, a respective panel parameter associated with each beam of the set of beams, a respective antenna module parameter associated with each beam of the set of beams, or any combination thereof.

In some examples of the method, apparatuses, and non-transitory computer-readable medium described herein, determining the beam combination parameter may include operations, features, means, or instructions for determining a first beam combination parameter for a first component carrier, a first subband, or both, in a carrier aggregation configuration, and determining a second beam combination parameter for a second component carrier, a second subband, or both, in the carrier aggregation configuration.

In some examples of the method, apparatuses, and non-transitory computer-readable medium described herein, the carrier aggregation configuration includes an inter-band carrier aggregation configuration or an intra-band carrier aggregation configuration.

In some examples of the method, apparatuses, and non-transitory computer-readable medium described herein, the beam configuration includes a respective indication for each beam of the dynamic beam, and the indication identifies a synchronization signal block, a channel state information reference signal, a sounding reference signal, or any combination thereof, for a respective beam.

In some examples of the method, apparatuses, and non-transitory computer-readable medium described herein, the beam combination parameter identifies a respective transmission configuration indication state, a respective channel state information reference signal resource indicator, a respective sounding reference signal resource indicator, or any combination thereof, corresponding to each beam of the set of beams.

In some examples of the method, apparatuses, and non-transitory computer-readable medium described herein, the set of beams identified in the report include the one or more beams that constitute generation of the dynamic beam.

In some examples of the method, apparatuses, and non-transitory computer-readable medium described herein, the respective signal parameter corresponding to each beam in the set of beams includes a reference signal received power, a reference signal received quality, a reference signal strength indicator, a signal to noise ratio, a signal to interference plus noise ratio, or any combination thereof.

A method of wireless communications at a base station is described. The method may include receiving, from a UE, a report indicating a beam combination parameter that identifies a signal quality corresponding to a combination of a set of beams in a set of beams, determining a dynamic beam including one or more beams of the set of beams based on receiving the report, transmitting a beam configuration indicating the dynamic beam, and communicating with the UE via the dynamic beam based on transmitting the beam configuration.

An apparatus for wireless communications at a base station is described. The apparatus may include a processor, memory coupled with the processor, and instructions stored in the memory. The instructions may be executable by the processor to cause the apparatus to receive, from a UE, a report indicating a beam combination parameter that identifies a signal quality corresponding to a combination of a set of beams in a set of beams, determine a dynamic beam including one or more beams of the set of beams based on receiving the report, transmit a beam configuration indicating the dynamic beam, and communicate with the UE via the dynamic beam based on transmitting the beam configuration.

Another apparatus for wireless communications at a base station is described. The apparatus may include means for receiving, from a UE, a report indicating a beam combination parameter that identifies a signal quality corresponding to a combination of a set of beams in a set of beams, determining a dynamic beam including one or more beams of the set of beams based on receiving the report, transmitting a beam configuration indicating the dynamic beam, and communicating with the UE via the dynamic beam based on transmitting the beam configuration.

A non-transitory computer-readable medium storing code for wireless communications at a base station is described. The code may include instructions executable by a processor to receive, from a UE, a report indicating a beam combination parameter that identifies a signal quality corresponding to a combination of a set of beams in a set of beams, determine a dynamic beam including one or more beams of the set of beams based on receiving the report, transmit a beam configuration indicating the dynamic beam, and communicate with the UE via the dynamic beam based on transmitting the beam configuration.

Some examples of the method, apparatuses, and non-transitory computer-readable medium described herein may further include operations, features, means, or instructions for determining a channel related beam parameter associated with the dynamic beam based on the beam configuration and the beam combination parameter.

In some examples of the method, apparatuses, and non-transitory computer-readable medium described herein, the channel related beam parameter includes a power delay profile for the dynamic beam, a timing offset for the dynamic beam, a frequency offset for the dynamic beam, or any combination thereof.

In some examples of the method, apparatuses, and non-transitory computer-readable medium described herein, the beam combination parameter includes a respective angular spread of each beam of the set of beams, a respective coverage area of each beam of the set of beams, a respective array gain of each beam of the set of beams, a respective signal-to-noise ratio gain of each beam of the set of beams, a respective panel parameter associated with each beam of the set of beams, a respective antenna module parameter associated with each beam of the set of beams, or any combination thereof.

In some examples of the method, apparatuses, and non-transitory computer-readable medium described herein, the beam combination parameter includes a first beam combination parameter for a first component carrier, a first subband, or both, in a carrier aggregation configuration and a second beam combination parameter for a second component carrier, a second subband, or both, in the carrier aggregation configuration.

In some examples of the method, apparatuses, and non-transitory computer-readable medium described herein, the carrier aggregation configuration includes an inter-band carrier aggregation configuration or an intra-band carrier aggregation configuration.

In some examples of the method, apparatuses, and non-transitory computer-readable medium described herein, the beam configuration includes a respective indication for each beam of the dynamic beam, and the indication identifies a synchronization signal block, a channel state information reference signal, a sounding reference signal, or any combination thereof, for a respective beam.

In some examples of the method, apparatuses, and non-transitory computer-readable medium described herein, the beam combination parameter identifies a respective transmission configuration indication state, a respective channel state information reference signal resource indicator, a respective sounding reference signal resource indicator, or any combination thereof, corresponding to each beam of the set of beams.

In some examples of the method, apparatuses, and non-transitory computer-readable medium described herein, the set of beams identified in the report include the one or more beams that constitute generation of the dynamic beam.

DETAILED DESCRIPTION

Figure 1:
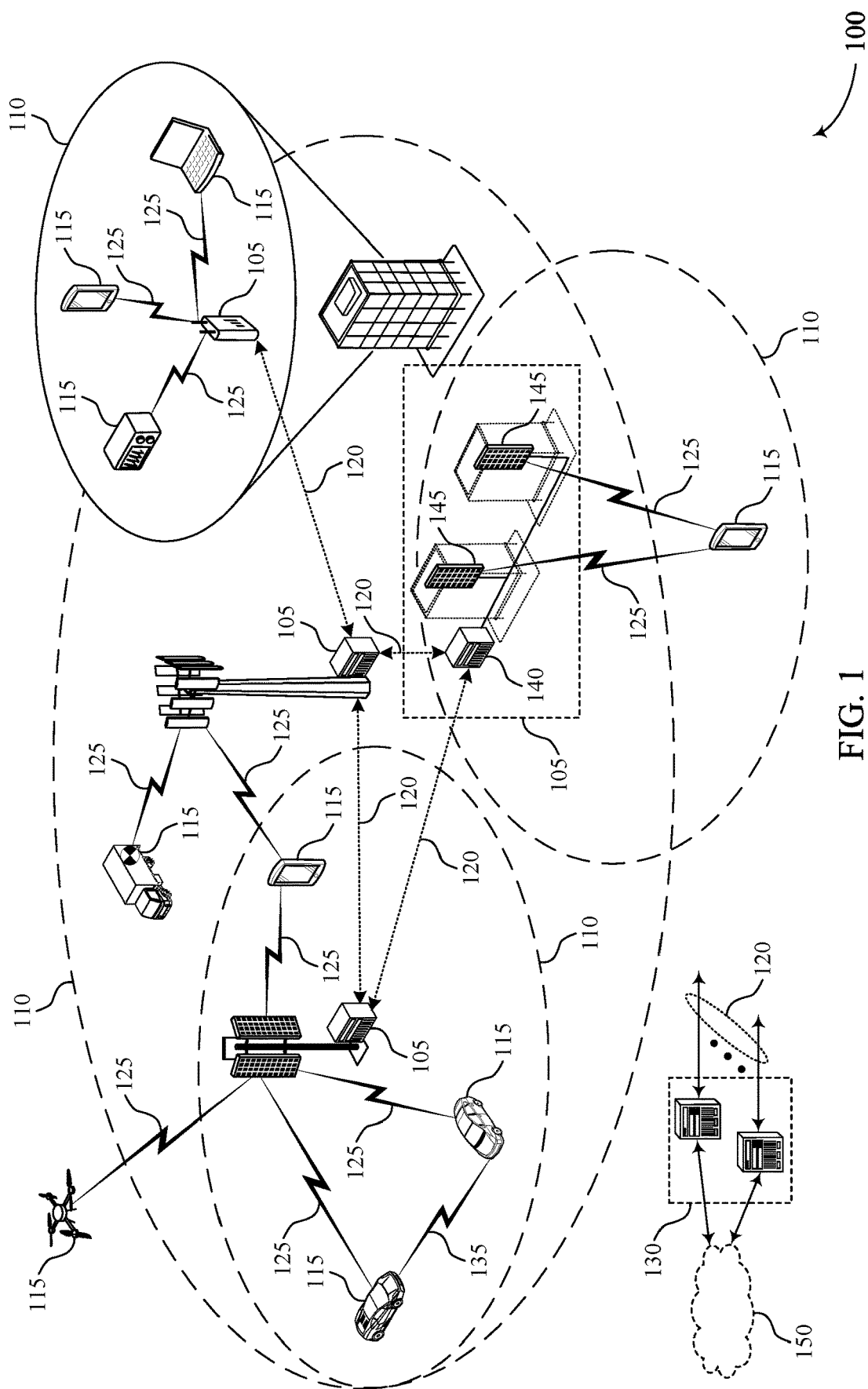
FIGS. 1 and 2 illustrate examples of wireless communications systems that supports techniques for beamforming enhancement and feedback in accordance with aspects of the present disclosure.

In some deployments, wireless communications systems may operate in millimeter wave (mmW) frequency ranges (e.g., 24 gigahertz (GHz), 26 GHz, 28 GHz, 39 GHz, 52.6-71 GHz, 71-114.25 GHz, among other examples). Wireless communications at these frequencies may be associated with increased signal attenuation (e.g., path loss, penetration loss, blockage loss), which may be influenced by various factors, such as diffraction, propagation environment, density of blockages, material properties, etc. Due to the increased amount of path, penetration and blockage losses in mmW communications systems, transmissions between wireless devices (e.g., from a base station and/or a user equipment (UE)) may be beamformed to coherently combine energy and overcome the path losses at these frequencies. Additionally, a receiving device may use beamforming techniques to configure one or more antennas, which may be included in an antenna array or an antenna array module, such that transmissions are received in a directional manner.

In some deployments, communications in mmW frequencies may utilize what is referred to as frequency range 2 (FR2), corresponding to deployments in the 24.25-52.6 GHz range (e.g., 24 GHz, 26 GHz, 28 GHz, 39 GHz, etc.). As demand for wireless communications increases, additional mmW frequencies may be desirable for some deployments, such as frequency range 4 (FR4) (e.g., upper mmW bands) which may be associated with 52.6 GHz, and beyond. In some deployments, wireless devices may use antenna modules that include a number of antenna elements or different subarrays.

A UE may communicate with a base station using beamformed transmissions. In some cases, a base station may configure the UE to communicate using a dynamic beam (e.g., a composite beam) that incorporates multiple individual directional beams to improve communications reliability or a communications rate. The UE may report a set of preferred beams to a base station, and the base station may select one or more of the preferred beams to generate the dynamic beam. In some cases, the UE may identify preferred beams based on reference signal quality. It may be beneficial for the UE to measure and indicate to the base station which beams may be suitable for combining to generate a dynamic beam.

According to the techniques described herein, a UE may be configured to measure and report a beam combination parameter to a base station to improve generation of a dynamic beam for beamformed communications. In some examples, the UE may measure the beam combination parameter in terms of angular spread/coverage area of individual beams, array or signal gains at antennas or panels of the UE, additional panel/antenna module related information, etc. Based on the reported beam combination, the base station may generate the dynamic beam and indicate a beam configuration to the UE for subsequent communications. In some examples, distinct beam combination parameters may be reported for each component carrier or subband in a carrier aggregation (CA) configuration (e.g., inter-band CA or intra-band CA, either in a single frequency range or across multiple frequency ranges).

In some examples, the base station may generate the dynamic beam by determining a power delay profile for the dynamic beam, or by determining timing and frequency offsets for the dynamic beam to combine the individual beams in phase. The base station may identify which beams the UE is to use for the dynamic beam, and the UE may use the individual beam information to compute the offsets or determine the profile.

Aspects of the disclosure are initially described in the context of wireless communications systems. An example beamforming configuration and an example process flow are then described. Aspects of the disclosure are further illustrated by and described with reference to apparatus diagrams, system diagrams, and flowcharts that relate to techniques for beamforming enhancement and feedback.

FIG. 1 illustrates an example of a wireless communications system 100 that supports techniques for beamforming enhancement and feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s$, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may be configured to measure and report a beam combination parameter to a base station 105 to improve generation of a dynamic beam for beamformed communications. In some examples, the UE 115 may measure the beam combination parameter in terms of angular spread/coverage area of individual beams, array or signal gains at antennas or panels of the UE 115, additional panel/antenna module related information, etc. Based on the reported beam combination, the base station 105 may generate the dynamic beam and indicate a beam configuration to the UE 115 for subsequent communications. In some examples, distinct beam combination parameters may be reported for each component carrier or subband in a CA configuration.

Figure 2:
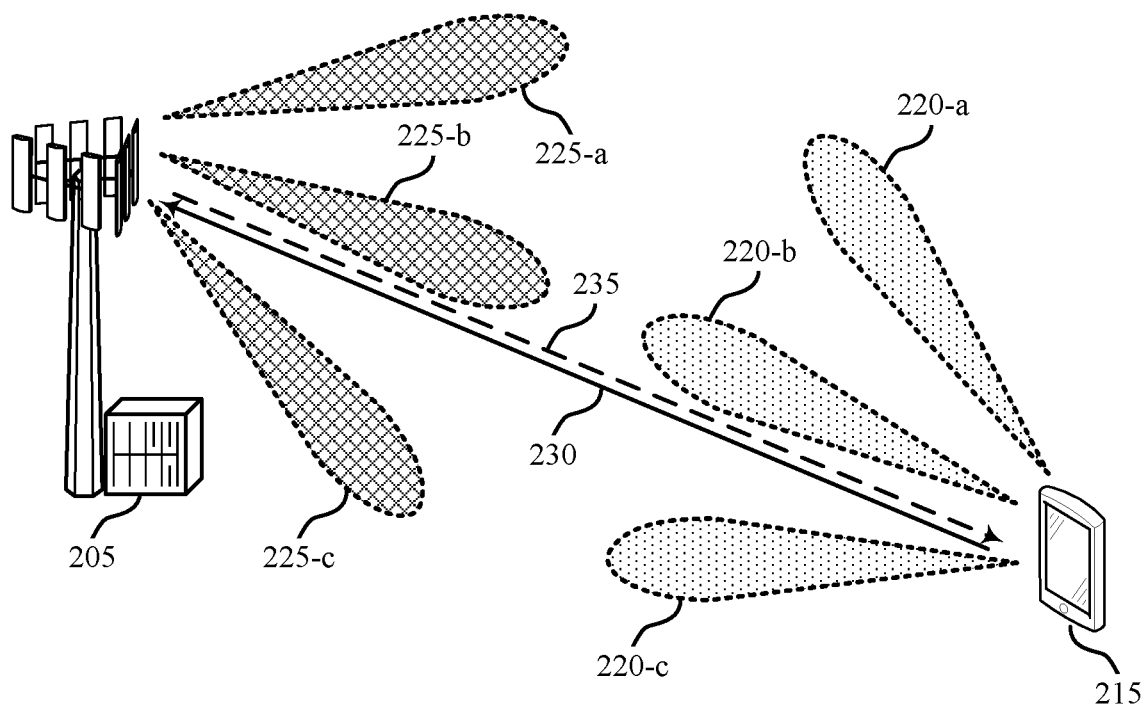
Figure 2:
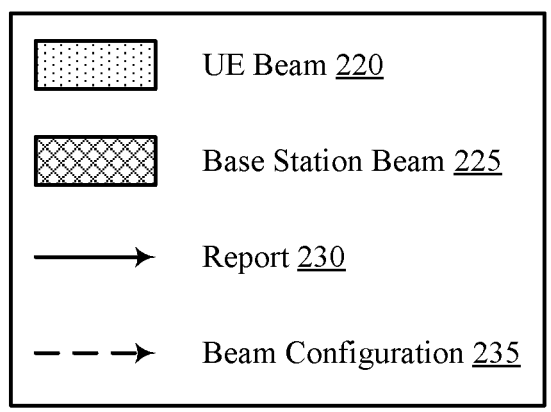

FIG. 2 illustrates an example of a wireless communications system 200 that supports techniques for beamforming enhancement and feedback in accordance with aspects of the present disclosure. In some examples, the wireless communications system 200 may implement aspects of wireless communications system 100. For example, the wireless communications system 200 may include a base station 205 and UEs 215, which may be examples of the corresponding devices described with reference to FIG. 1. The wireless communications system 200 may include features for improved communications between the UE 215 and the base station 205, among other benefits.

The base station 205 may communicate with the UE 215 using beamforming techniques. For example, the base station 205 and the UE 215 may communicate with one another via one or more base station beams 225 and one or more UE beams 220. Individual base station beams 225 may correspond to individual UE beams 220 for communications in the wireless communications system 200. In some examples, the communications illustrated in FIG. 2 may include downlink transmissions to the UE 215, where the base station beams 225 may be transmission beams and the UE beams 220 may be reception beams. Additionally or alternatively, the communications illustrated in FIG. 2 may include uplink transmissions from the UE 215, where the base station beams 225 may be reception beams and the UE beams 220 may be transmission beams.

In some examples, a base station 205 may configure a dynamic beam (e.g., a composite beam) to improve a communications reliability or rate with the UE 215. The dynamic beam may include one or more base station beams 225 or one or more UE beams 220. The dynamic beam may have a greater likelihood of detection and improved communication rates compared to an individual base station beam 225 or UE beam 220. For example, a dynamic beam that includes a set of base station beams 225 may be detected by the UE 215 at one or more antenna arrays positioned at various physical locations of the UE 215, even if interference or path loss prevents detection of an individual base station beam 225 (e.g., a base station beam 225-*a*).

The UE 215 may be configured to report a set of preferred base station beams 225 to the base station 205 for generation of the dynamic beam. The UE 215 may measure reference signals (e.g., a channel state information reference signal (CSI-RS), a tracking reference signal (TRS), a sounding reference signal (SRS), among other examples) transmitted via the base station beams 225. For example, the UE 215 may measure a reference signal received power (RSRP), a reference signal received quality (RSRQ), a reference signal strength indicator (RSSI), a signal to noise ratio (SNR), a signal to interference plus noise ratio (SINR), or any combination thereof, associated with the reference signals. In some examples, each base station beam 225 may be identified by an indicator, such as a CSI-RS resource indicator (CRI) or a transmission configuration indication (TCI) state. Similarly, each corresponding UE beam 220 may be identified by an indicator, such as an SRS resource indicator (SRI).

According to the techniques described herein, the UE 215 may be configured to measure signal parameters and report a beam combination parameter identifying which base station beams 225 may be suitable for combining to generate the dynamic beam. For example, the UE 215 may measure a respective angular spread or coverage area for each base station beam 225, array gains or received SNR gains at the UE 215, other information related to panels or antenna modules at the UE 215 or the base station 205, or any combination thereof. In some examples, the UE 215 may communicate with the base station 205 via a set of component carriers (CCs) or subbands in a CA configuration (e.g., inter-band CA or intra-band CA, within a single frequency range or across multiple frequency ranges). The UE 215 may report a separate beam combination parameter for each CC or subband in the CA configuration. The beam combination parameter (or parameters) may enable the base station 205 to determine whether to combine (e.g., co-phase) individual base station beams 225 to generate the dynamic beam.

The UE 215 may transmit a report 230 including the beam combination parameter to the base station 205. The beam combination parameter may identify a signal quality (e.g., the measured signal parameters) corresponding to the set of beams suitable for combining to generate the dynamic beam. In some examples, the beam combination parameter may identify the preferred base station beams 225. Additionally or alternatively, the UE 215 may identify the UE beams 220 corresponding to the preferred base station beams 225. The UE 215 may identify the beams by including indicators (e.g., TCI states, CRIs, SRIs, among other examples) corresponding to the beams.

Based on the beam combination parameter, the base station 205 may generate the dynamic beam for communicating with the UE 215. In some examples, the base station 205 may determine a channel related beam parameter for combining the individual base station beams 225 in phase. The channel related beam parameter may include a power delay profile for the dynamic beam, or timing and frequency offsets for the dynamic beam, or both. In some examples, the base station 205 may be constrained to generate the dynamic beam from the base station beams 225 identified in the report 230.

The base station 205 may transmit a beam configuration 235 indicating the dynamic beam to the UE 215. In some examples, the beam configuration 235 may indicate a respective signal synchronization block (SSB), a respective CSI-RS, or both, for each individual base station beam 225 of the dynamic beam. Based on the identified base station beams 225 in the beam configuration 235, the UE 215 may compute the channel related beam parameter for the dynamic beam, and communicate with the base station 205 via the dynamic beam.

Figure 3:
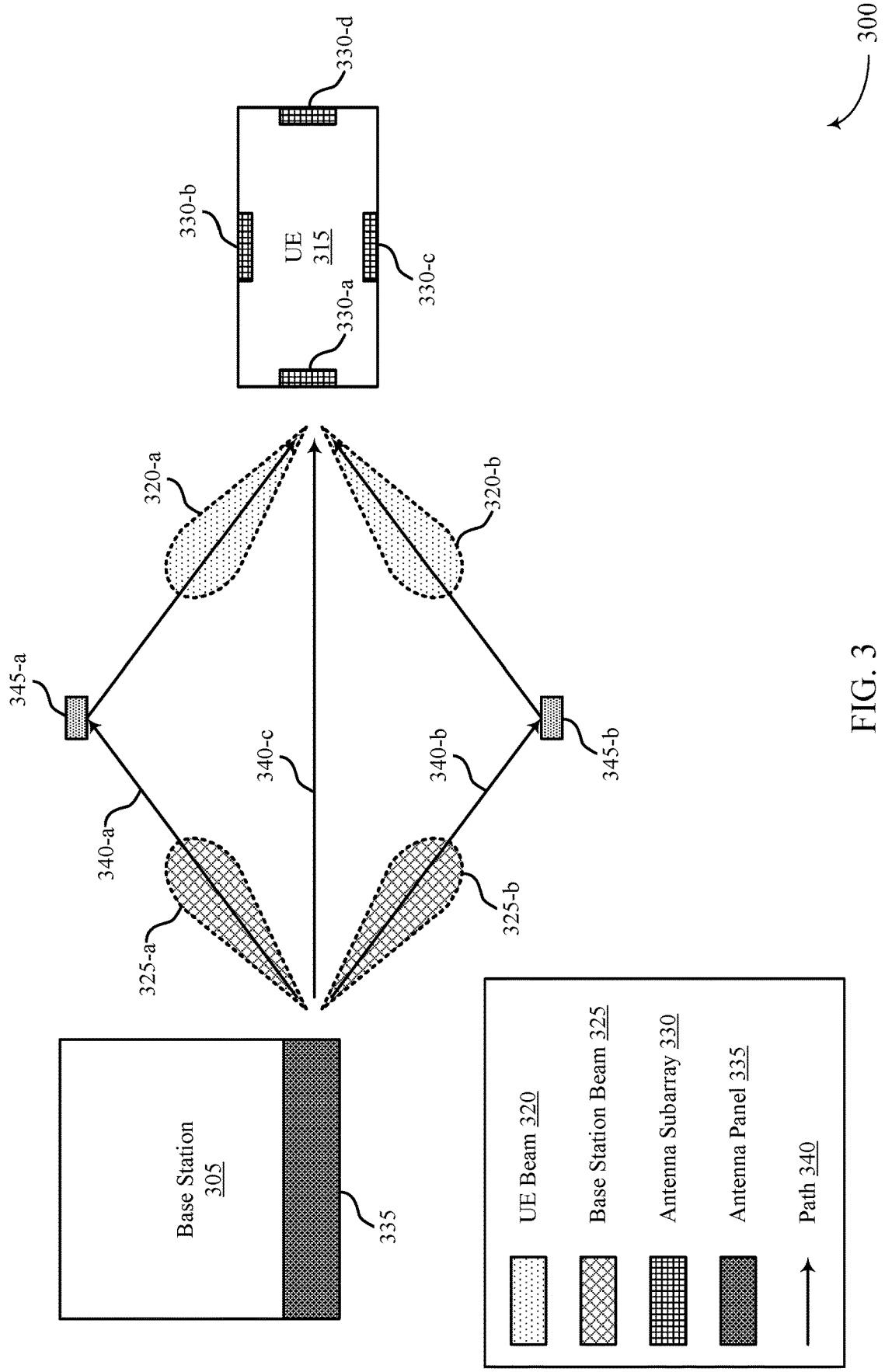
FIG. 3 illustrates an example of a beamforming configuration that supports techniques for beamforming enhancement and feedback in accordance with aspects of the present disclosure.

FIG. 3 illustrates an example of a beamforming configuration 300 that supports techniques for beamforming enhancement and feedback in accordance with aspects of the present disclosure. In some examples, the beamforming configuration 300 may implement aspects of wireless communications systems 100 and 200. For example, the beamforming configuration 300 may be associated with communications between a UE 315 and a base station 305, which may be examples of corresponding devices described with reference to FIGS. 1 and 2. The beamforming configuration 300 may illustrate features for improved communications between the UE 315 and the base station 305, among other benefits.

The base station 305 and the UE 315 may communicate with one another via one or more base station beams 325 and one or more UE beams 330. Individual base station beams 325 may correspond to individual UE beams 320 along clusters or paths 340. For example, a transmission from the base station 305 transmitted via a base station beam 325-*a* may propagate along a cluster or path 340-*a*, which may include a reflection 345-*a*, and be received by the UE 315 via a UE beam 320-*a*.

In some examples, a base station 305 may configure a dynamic beam (e.g., a composite beam) to improve communications reliability with the UE 315. The dynamic beam may include one or more base station beams 325 or one or more UE beams 320. The dynamic beam may have a greater likelihood of detection than an individual base station beam 325 or UE beam 320. For example, a dynamic beam that includes a set of base station beams 325 may be detected by the UE 315 at one or more antenna subarrays 330 positioned at various physical locations of the UE 315, even if interference or path loss prevents detection of an individual base station beam 325 (e.g., a base station beam 325-*a*). The UE 315 may be configured to report a set of preferred base station beams 325 to the base station 305 for generation of the dynamic beam. The UE 315 may measure reference signals (e.g., a CSI-RS, a TRS, an SRS, among other examples) transmitted via the base station beams 325.

According to the techniques described herein, the UE 315 may be configured to measure signal parameters and report a beam combination parameter identifying which base station beams 325 may be suitable for combining to generate the dynamic beam. For example, the UE 315 may measure a respective angular spread or coverage area for each base station beam 325, array gains or received SNR gains at the antenna subarrays 330 of the UE 315, other information related to the antenna subarrays 330 of the UE 315 or an antenna panel 335 at the base station 305, or any combination thereof. The beam combination parameter may enable the base station 305 to determine whether to combine (e.g., co-phase) individual base station beams 325 to generate the dynamic beam.

The UE 315 may transmit a report including the beam combination parameter to the base station 305. Based on the beam combination parameter, the base station 305 may generate the dynamic beam for communicating with the UE 315. In some examples, the base station 305 may be constrained to generate the dynamic beam from the base station beams 325 identified in the report.

The base station 305 may transmit a beam configuration indicating the dynamic beam to the UE 315. In some examples, the beam configuration 335 may indicate a respective SSB, a respective CSI-RS, or both, for each individual base station beam 325 of the dynamic beam. Based on the identified base station beams 325 in the beam configuration 335, the UE 315 may communicate with the base station 305 via the dynamic beam.

Figure 4:
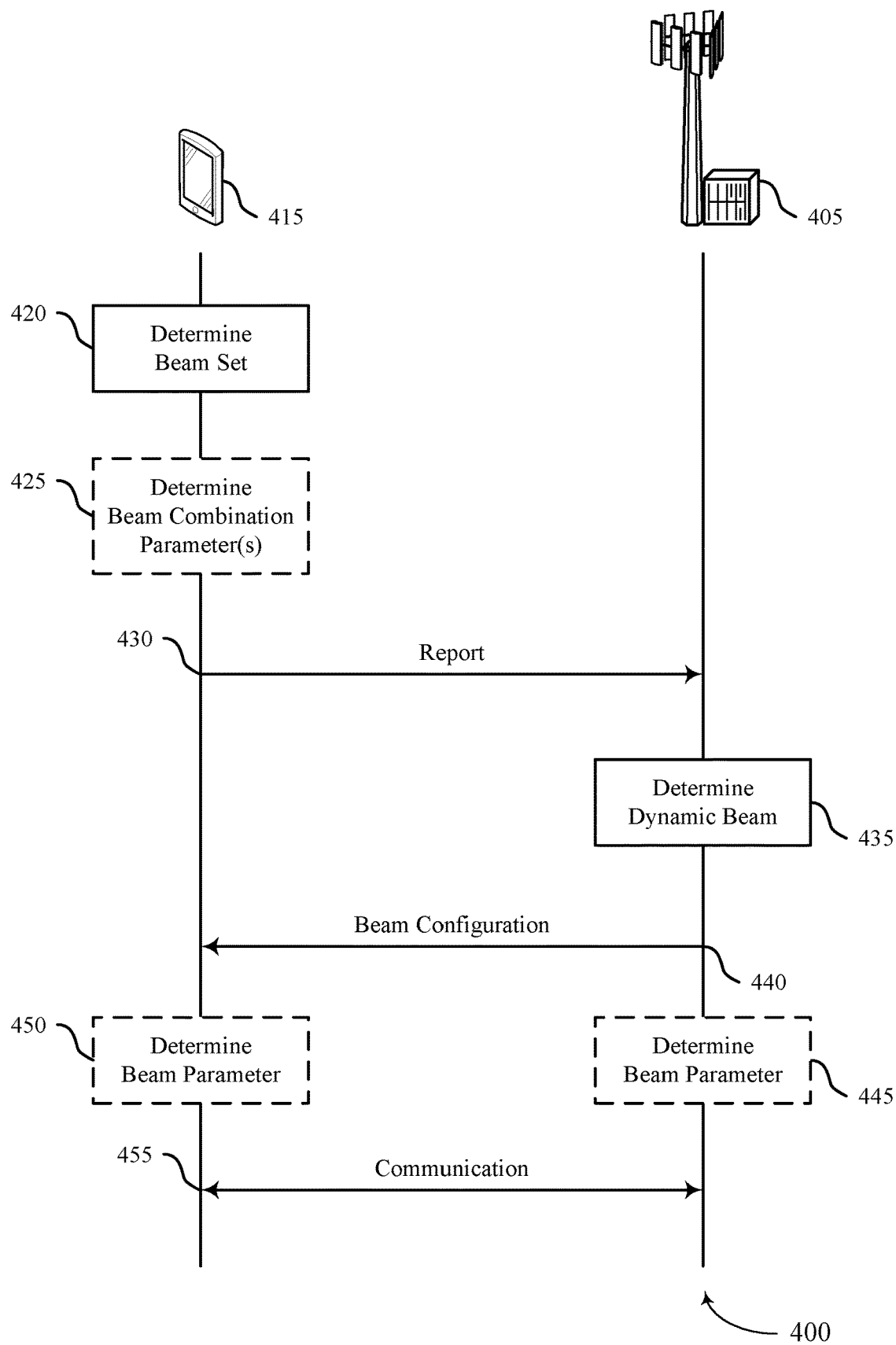
FIG. 4 illustrates an example of a process flow that supports techniques for beamforming enhancement and feedback in accordance with aspects of the present disclosure.

FIG. 4 illustrates an example of a process flow 400 that supports techniques for beamforming enhancement and feedback in accordance with aspects of the present disclosure. In some examples, the process flow 400 may implement aspects of wireless communications systems 100 and 200. For example, the process flow 400 may include example operations associated with one or more of a base station 405 or a UE 415, which may be examples of the corresponding devices described with reference to FIGS. 1 and 2. In the following description of the process flow 400, the operations between the base station 405 and the UE 415 may be performed in a different order than the example order shown, or the operations performed by the base station 405 and the UE 415 may be performed in different orders or at different times. Some operations may also be omitted from the process flow 400, and other operations may be added to the process flow 400. The operations performed by the base station 405 and the UE 415 may support improvement to the base station 405 beam configuration operations and, in some examples, may promote improvements to efficiency and reliability for communications between the base station 405 and the UE 415, among other benefits.

At 420, the UE 415 may determine a set of beams for communications with the base station 405. The set of beams may include preferred beams suitable for combining to generate a dynamic beam (e.g., a composite beam). The dynamic beam may have a greater likelihood of detection or achievable rate than an individual beam of the set of beams. For example, a dynamic beam that includes one or more beams may be detected by the UE 415 at one or more antenna arrays positioned at various physical locations of the UE 415, even if interference or path loss prevents detection of an individual beam. In some examples, the UE 415 may measure reference signals (e.g., a CSI-RS, a TRS, an SRS, among other examples) transmitted via the beams to determine the set of beams. For example, the UE 415 may measure an RSRP, an RSRQ, an RSSI, an SNR, an SINR, or any combination thereof, associated with the reference signals. In some examples, each beam may be identified by an indicator, such as a CRI, a TCI state, an SRI, etc.

In some examples, at 425 the UE 415 may measure signal parameters and determine a beam combination parameter identifying which beams may be suitable for combining to generate the dynamic beam. For example, the UE 415 may measure a respective angular spread or coverage area for each beam, array gains or received SNR gains at the UE 415, other information related to panels or antenna modules at the UE 415 or the base station 405, or any combination thereof. In some examples, the UE 415 may communicate with the base station 405 via a set of CCs or subbands in a CA configuration (e.g., inter-band CA or intra-band CA). The UE 415 may report a separate beam combination parameter for each CC or subband in the CA configuration. The beam combination parameter (or parameters) may enable the base station 405 to determine whether to combine (e.g., co-phase) individual base station beams 425 to generate the dynamic beam.

At 430, the UE 415 may transmit a report including the beam combination parameter to the base station 405. The beam combination parameter may identify a signal quality (e.g., the measured signal parameters) corresponding to the set of beams suitable for combining to generate the dynamic beam. The UE 415 may identify the beams by including indicators (e.g., TCI states, CRIs, SRIs, among other examples) corresponding to the beams.

At 435, the base station 405 may determine the dynamic beam for communicating with the UE 415. The base station 405 may generate the dynamic beam based on the beam combination parameter. In some examples, the base station 405 may be constrained to generate the dynamic beam from the beams identified in the report. At 440, the base station 405 may transmit a beam configuration indicating the dynamic beam to the UE 415. In some examples, the beam configuration may indicate a respective SSB, a respective CSI-RS, or both, for each individual beam of the dynamic beam.

In some examples, at 445 the base station 405 may determine a channel related beam parameter for combining the individual beams in phase. The channel related beam parameter may include a power delay profile for the dynamic beam, or timing and frequency offsets for the dynamic beam, or both. In some examples, at 450 the UE 415 may determine the channel related beam parameter for the dynamic beam based on the beam configuration.

At 455, the UE 415 may communicate with the base station 405 via the dynamic beam based on the beam configuration. The operations performed by the base station 405 and the UE 415 may support improvement to the beamforming operations and, in some examples, may promote improvements to efficiency and reliability for communications between the base station 405 and the UE 415, among other benefits.

Figure 5:
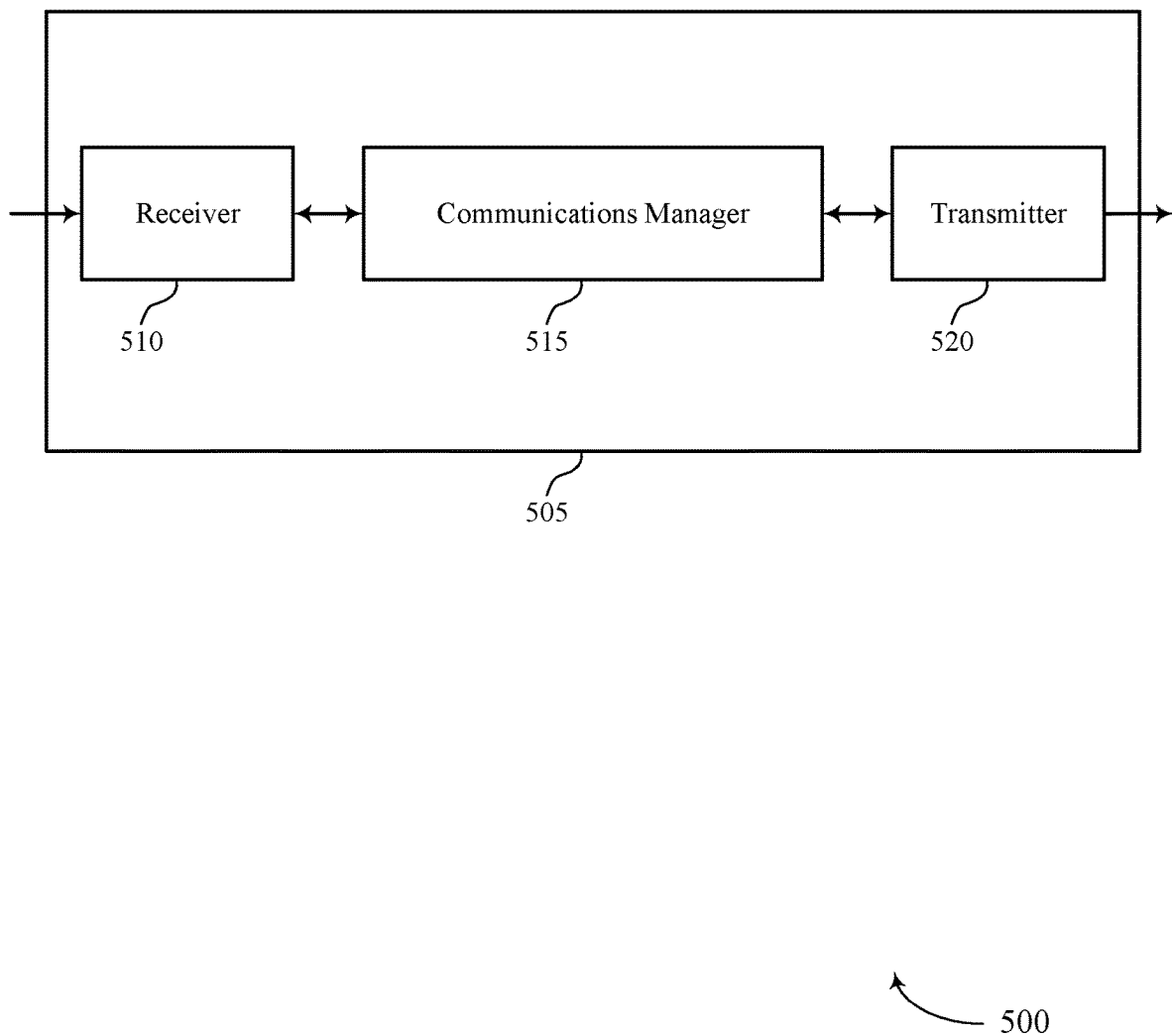
FIGS. 5 and 6 show block diagrams of devices that support techniques for beamforming enhancement and feedback in accordance with aspects of the present disclosure.

FIG. 5 shows a block diagram 500 of a device 505 that supports techniques for beamforming enhancement and feedback in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for beamforming enhancement and feedback, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a set of beams configured for communications between the UE and a base station based on measuring a respective signal parameter corresponding to each beam in the set of beams, transmit, to the base station, a report indicating a beam combination parameter that identifies a signal quality corresponding to a combination of a set of beams in the set of beams, receive a beam configuration based on transmitting the report, where the beam configuration indicates a dynamic beam including one or more beams of the set of beams, and communicate with the base station via the dynamic beam based on receiving the beam configuration.

The communications manager 515 as described herein may be implemented to realize one or more potential advantages. One implementation may allow the device 505 to save power and increase battery life by communicating with a base station 105 (as shown in FIG. 1) more efficiently. For example, the device 505 may efficiently communicate with the base station 105 via the dynamic beam based on receiving the beam configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
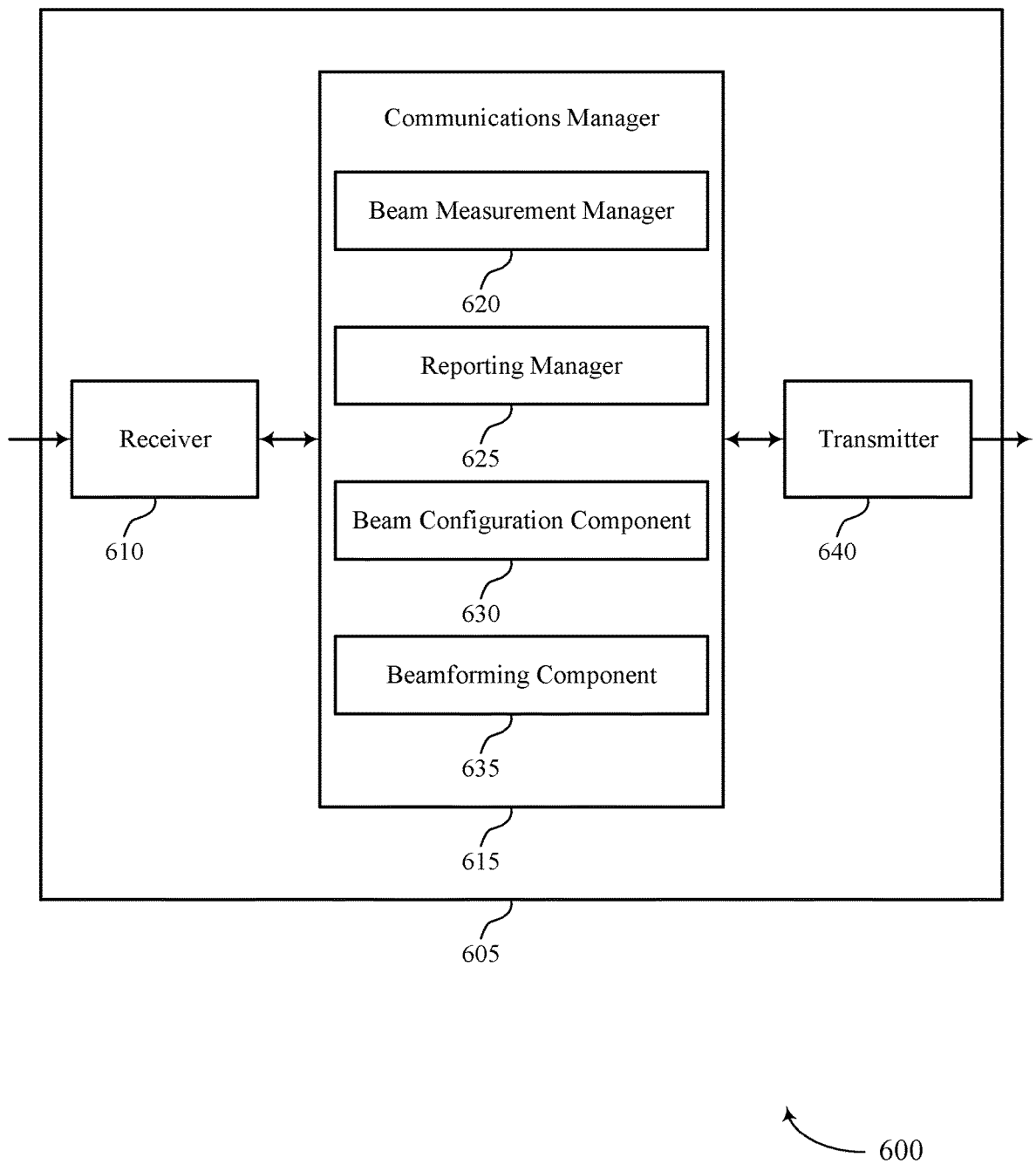

FIG. 6 shows a block diagram 600 of a device 605 that supports techniques for beamforming enhancement and feedback in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for beamforming enhancement and feedback, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a beam measurement manager 620, a reporting manager 625, a beam configuration component 630, and a beamforming component 635. The communications manager 615 may be an example of aspects of the communications manager 810 described herein.

The beam measurement manager 620 may determine a set of beams configured for communications between the UE and a base station based on measuring a respective signal parameter corresponding to each beam in the set of beams.

The reporting manager 625 may transmit, to the base station, a report indicating a beam combination parameter that identifies a signal quality corresponding to a combination of a set of beams in the set of beams.

The beam configuration component 630 may receive a beam configuration based on transmitting the report, where the beam configuration indicates a dynamic beam including one or more beams of the set of beams.

The beamforming component 635 may communicate with the base station via the dynamic beam based on receiving the beam configuration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
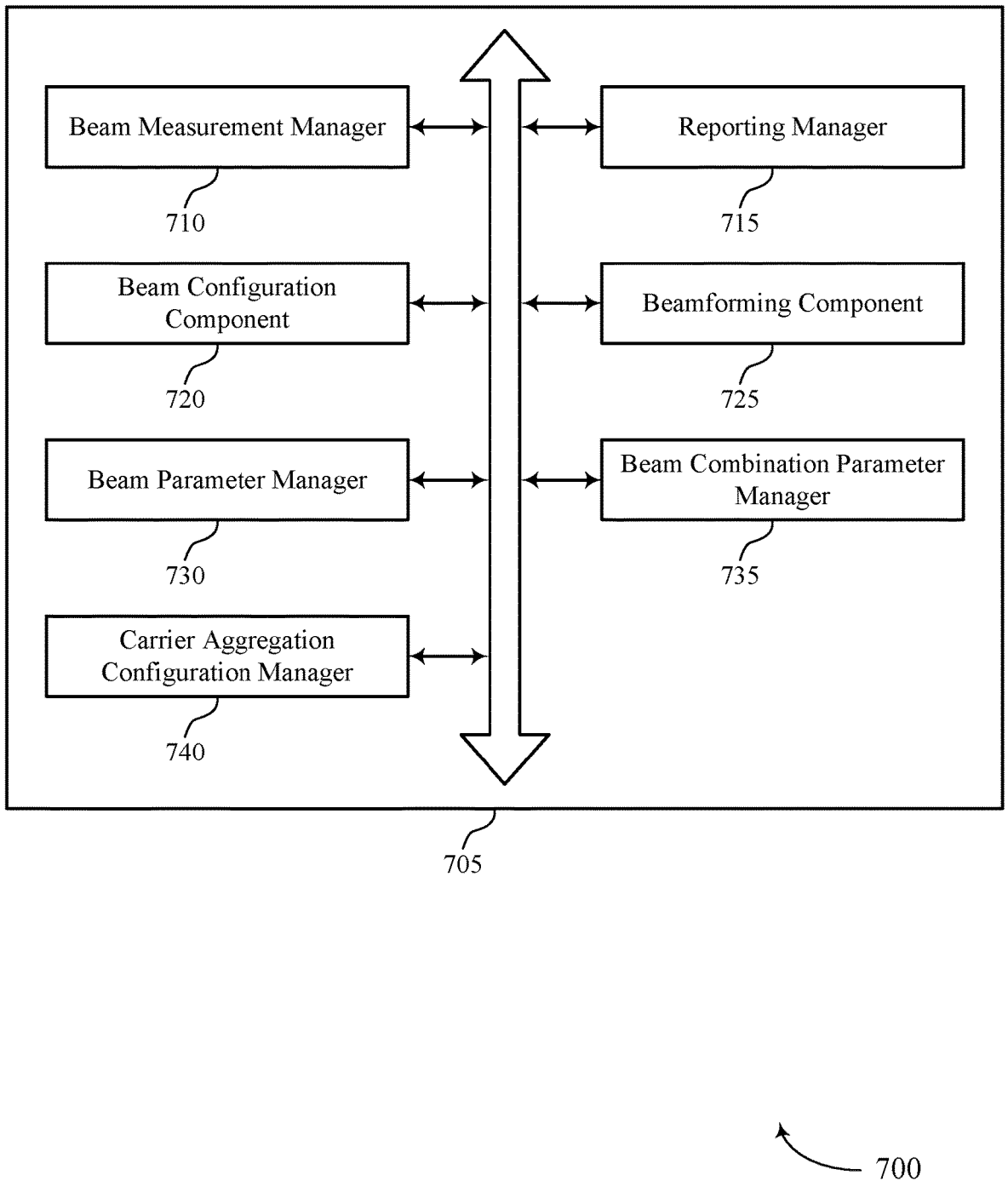
FIG. 7 shows a block diagram of a communications manager that supports techniques for beamforming enhancement and feedback in accordance with aspects of the present disclosure.

FIG. 7 shows a block diagram 700 of a communications manager 705 that supports techniques for beamforming enhancement and feedback in accordance with aspects of the present disclosure. The communications manager 705 may be an example of aspects of a communications manager 515, a communications manager 615, or a communications manager 810 described herein. The communications manager 705 may include a beam measurement manager 710, a reporting manager 715, a beam configuration component 720, a beamforming component 725, a beam parameter manager 730, a beam combination parameter manager 735, and a carrier aggregation configuration manager 740. Each of these modules may communicate, directly or indirectly, with one another (e.g., via one or more buses).

The beam measurement manager 710 may determine a set of beams configured for communications between the UE and a base station based on measuring a respective signal parameter corresponding to each beam in the set of beams.

In some cases, the respective signal parameter corresponding to each beam in the set of beams includes a reference signal received power, a reference signal received quality, a reference signal strength indicator, a signal to noise ratio, a signal to interference plus noise ratio, or any combination thereof.

The reporting manager 715 may transmit, to the base station, a report indicating a beam combination parameter that identifies a signal quality corresponding to a combination of a set of beams in the set of beams.

The beam configuration component 720 may receive a beam configuration based on transmitting the report, where the beam configuration indicates a dynamic beam including one or more beams of the set of beams.

In some cases, the beam configuration includes a respective indication for each beam of the dynamic beam.

In some cases, the indication identifies a synchronization signal block, a channel state information reference signal, a sounding reference signal, or any combination thereof, for a respective beam.

In some cases, the set of beams identified in the report include the one or more beams that constitute generation of the dynamic beam.

The beamforming component 725 may communicate with the base station via the dynamic beam based on receiving the beam configuration.

The beam parameter manager 730 may determine a channel related beam parameter associated with the dynamic beam based on the beam configuration and the signal parameters corresponding to the one or more beams of the dynamic beam.

In some cases, the channel related beam parameter includes a power delay profile for the dynamic beam, a timing offset for the dynamic beam, a frequency offset for the dynamic beam, or any combination thereof.

The beam combination parameter manager 735 may determine the beam combination parameter based on measuring the signal parameters.

In some cases, the beam combination parameter includes a respective angular spread of each beam of the set of beams, a respective coverage area of each beam of the set of beams, a respective array gain of each beam of the set of beams, a respective signal-to-noise ratio gain of each beam of the set of beams, a respective panel parameter associated with each beam of the set of beams, a respective antenna module parameter associated with each beam of the set of beams, or any combination thereof.

In some cases, the beam combination parameter identifies a respective transmission configuration indication state, a respective channel state information reference signal resource indicator, a respective sounding reference signal resource indicator, or any combination thereof, corresponding to each beam of the set of beams.

The carrier aggregation configuration manager 740 may determine a first beam combination parameter for a first component carrier, a first subband, or both, in a carrier aggregation configuration.

In some examples, the carrier aggregation configuration manager 740 may determine a second beam combination parameter for a second component carrier, a second subband, or both, in the carrier aggregation configuration.

In some cases, the carrier aggregation configuration includes an inter-band carrier aggregation configuration or an intra-band carrier aggregation configuration.

Figure 8:
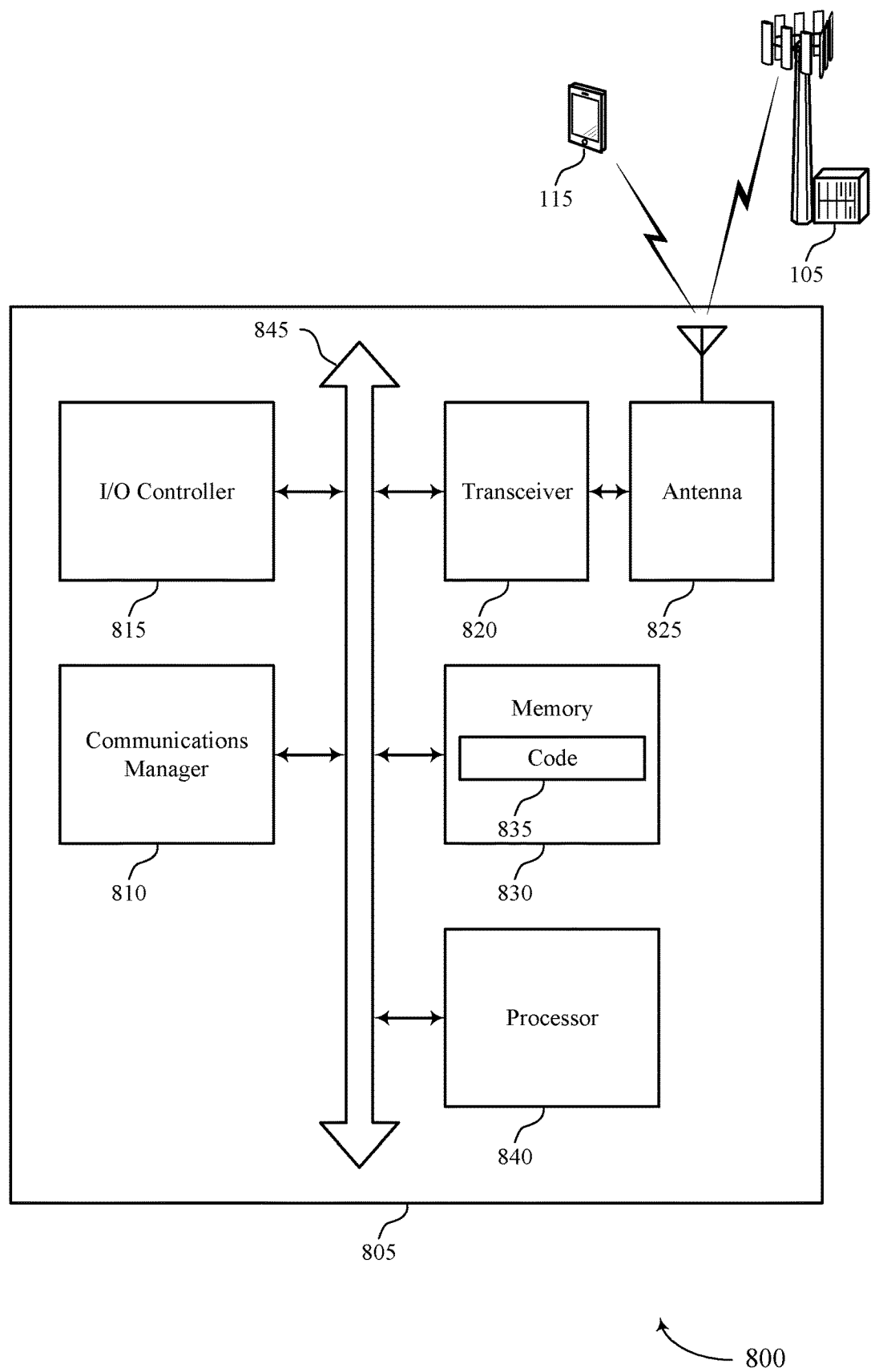
FIG. 8 shows a diagram of a system including a device that supports techniques for beamforming enhancement and feedback in accordance with aspects of the present disclosure.

FIG. 8 shows a diagram of a system 800 including a device 805 that supports techniques for beamforming enhancement and feedback in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a set of beams configured for communications between the UE and a base station based on measuring a respective signal parameter corresponding to each beam in the set of beams, transmit, to the base station, a report indicating a beam combination parameter that identifies a signal quality corresponding to a combination of a set of beams in the set of beams, receive a beam configuration based on transmitting the report, where the beam configuration indicates a dynamic beam including one or more beams of the set of beams, and communicate with the base station via the dynamic beam based on receiving the beam configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for beamforming enhancement and feedback).

The processor 840 of the device 805 (e.g., controlling the receiver 510, the transmitter 520, or the transceiver 820) may reduce power consumption and increase communications efficiency based on communicating via the dynamic beam. In some examples, the processor 840 of the device 805 may reconfigure parameters for beamforming operations according to the received beam configuration. For example, the processor 840 of the device 805 may turn on one or more processing units for reconfiguring antenna subarrays, increase a processing clock, or a similar mechanism within the device 805. As such, when subsequent beam configurations are received, the processor 840 may be ready to respond more efficiently through the reduction of a ramp up in processing power.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
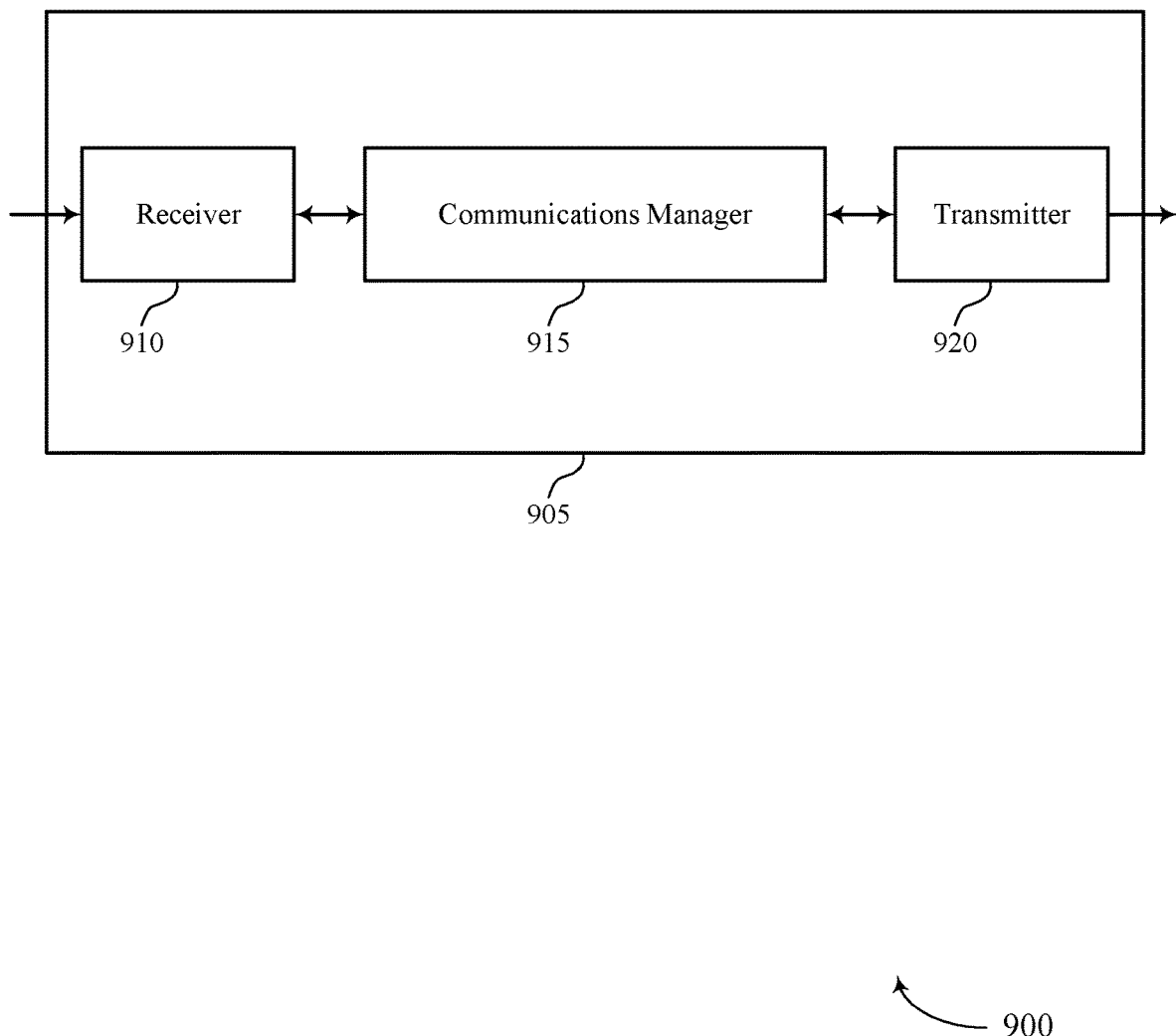
FIGS. 9 and 10 show block diagrams of devices that support techniques for beamforming enhancement and feedback in accordance with aspects of the present disclosure.

FIG. 9 shows a block diagram 900 of a device 905 that supports techniques for beamforming enhancement and feedback in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for beamforming enhancement and feedback, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a report indicating a beam combination parameter that identifies a signal quality corresponding to a combination of a set of beams in a set of beams, determine a dynamic beam including one or more beams of the set of beams based on receiving the report, transmit a beam configuration indicating the dynamic beam, and communicate with the UE via the dynamic beam based on transmitting the beam configuration.

The communications manager 915 as described herein may be implemented to realize one or more potential advantages. One implementation may allow the device 905 to save power by communicating with a UE 115 (as shown in FIG. 1) more efficiently. For example, the device 905 may improve reliability in communications with a UE 115, as the device 905 may be able to determine and indicate dynamic beam based on receiving the beam combination parameter from the UE 115. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
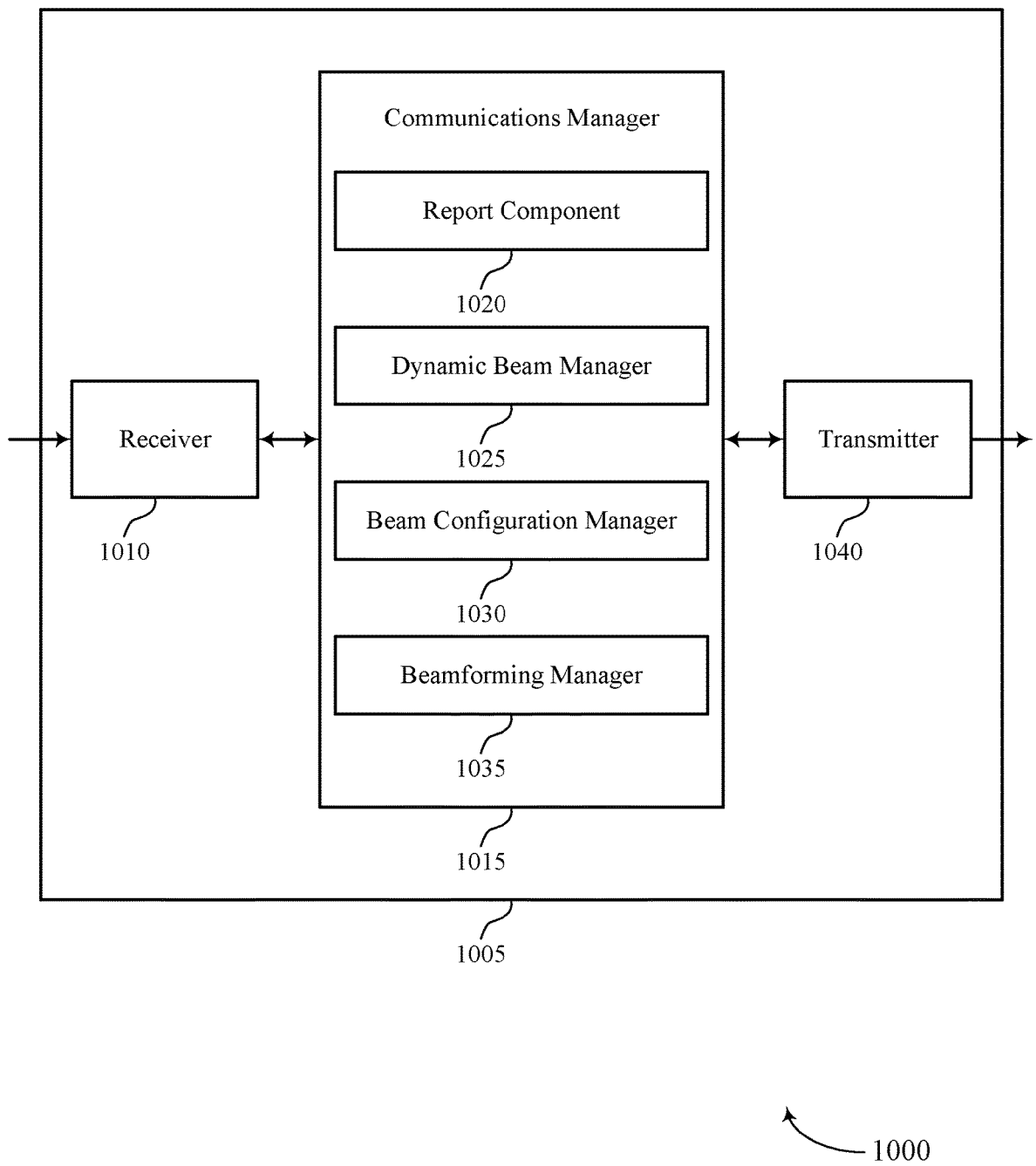

FIG. 10 shows a block diagram 1000 of a device 1005 that supports techniques for beamforming enhancement and feedback in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for beamforming enhancement and feedback, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a report component 1020, a dynamic beam manager 1025, a beam configuration manager 1030, and a beamforming manager 1035. The communications manager 1015 may be an example of aspects of the communications manager 1210 described herein.

The report component 1020 may receive, from a UE, a report indicating a beam combination parameter that identifies a signal quality corresponding to a combination of a set of beams in a set of beams.

The dynamic beam manager 1025 may determine a dynamic beam including one or more beams of the set of beams based on receiving the report.

The beam configuration manager 1030 may transmit a beam configuration indicating the dynamic beam.

The beamforming manager 1035 may communicate with the UE via the dynamic beam based on transmitting the beam configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
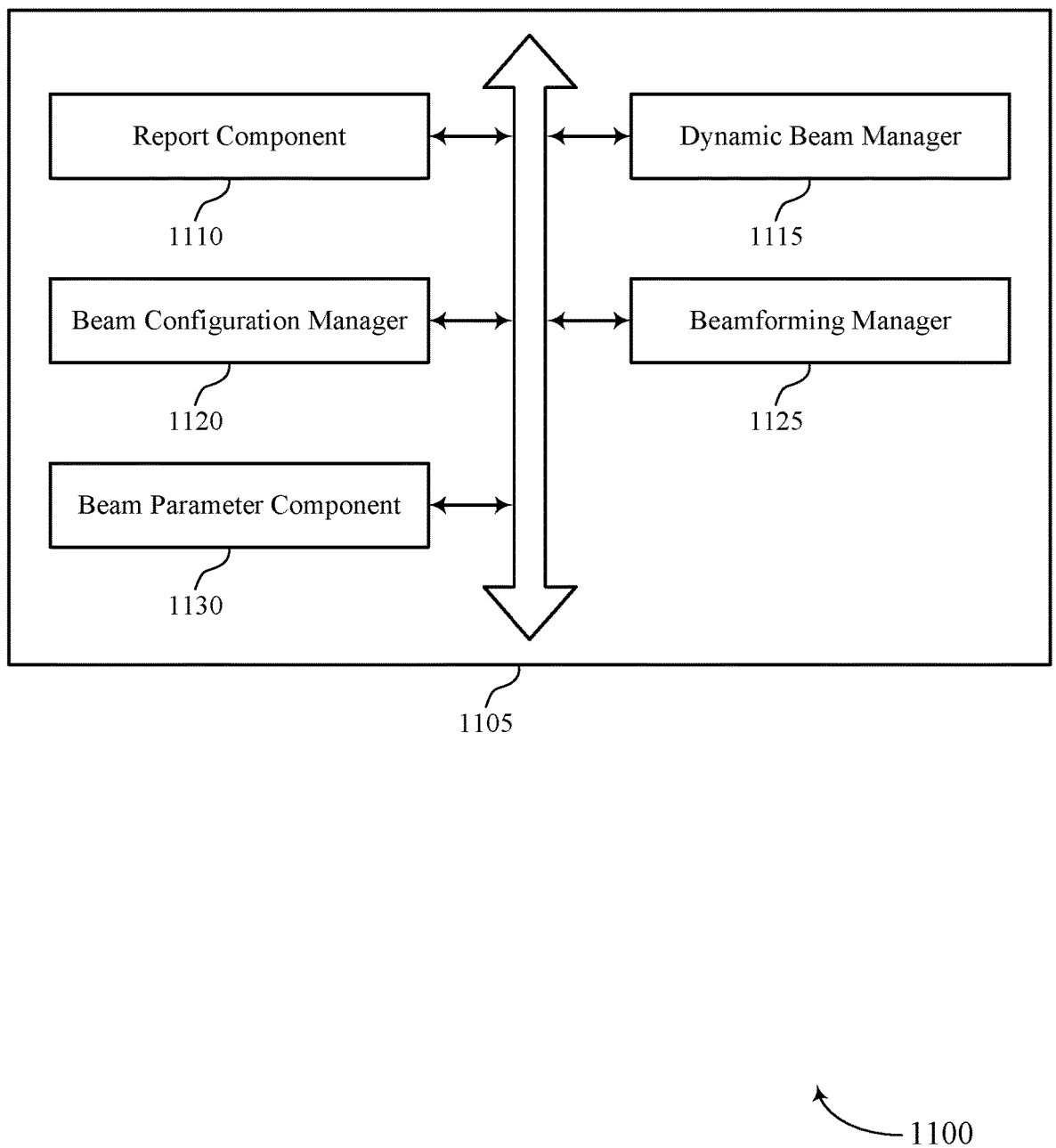
FIG. 11 shows a block diagram of a communications manager that supports techniques for beamforming enhancement and feedback in accordance with aspects of the present disclosure.

FIG. 11 shows a block diagram 1100 of a communications manager 1105 that supports techniques for beamforming enhancement and feedback in accordance with aspects of the present disclosure. The communications manager 1105 may be an example of aspects of a communications manager 915, a communications manager 1015, or a communications manager 1210 described herein. The communications manager 1105 may include a report component 1110, a dynamic beam manager 1115, a beam configuration manager 1120, a beamforming manager 1125, and a beam parameter component 1130. Each of these modules may communicate, directly or indirectly, with one another (e.g., via one or more buses).

The report component 1110 may receive, from a UE, a report indicating a beam combination parameter that identifies a signal quality corresponding to a combination of a set of beams in a set of beams.

In some cases, the beam combination parameter includes a respective angular spread of each beam of the set of beams, a respective coverage area of each beam of the set of beams, a respective array gain of each beam of the set of beams, a respective signal-to-noise ratio gain of each beam of the set of beams, a respective panel parameter associated with each beam of the set of beams, a respective antenna module parameter associated with each beam of the set of beams, or any combination thereof.

In some cases, the beam combination parameter includes a first beam combination parameter for a first component carrier, a first subband, or both, in a carrier aggregation configuration and a second beam combination parameter for a second component carrier, a second subband, or both, in the carrier aggregation configuration.

In some cases, the carrier aggregation configuration includes an inter-band carrier aggregation configuration or an intra-band carrier aggregation configuration.

In some cases, the beam combination parameter identifies a respective transmission configuration indication state, a respective channel state information reference signal resource indicator, a respective sounding reference signal resource indicator, or any combination thereof, corresponding to each beam of the set of beams.

The dynamic beam manager 1115 may determine a dynamic beam including one or more beams of the set of beams based on receiving the report.

In some cases, the set of beams identified in the report include the one or more beams that constitute generation of the dynamic beam.

The beam configuration manager 1120 may transmit a beam configuration indicating the dynamic beam.

In some cases, the beam configuration includes a respective indication for each beam of the dynamic beam.

In some cases, the indication identifies a synchronization signal block, a channel state information reference signal, a sounding reference signal, or any combination thereof, for a respective beam.

The beamforming manager 1125 may communicate with the UE via the dynamic beam based on transmitting the beam configuration.

The beam parameter component 1130 may determine a channel related beam parameter associated with the dynamic beam based on the beam configuration and the beam combination parameter.

In some cases, the channel related beam parameter includes a power delay profile for the dynamic beam, a timing offset for the dynamic beam, a frequency offset for the dynamic beam, or any combination thereof.

Figure 12:
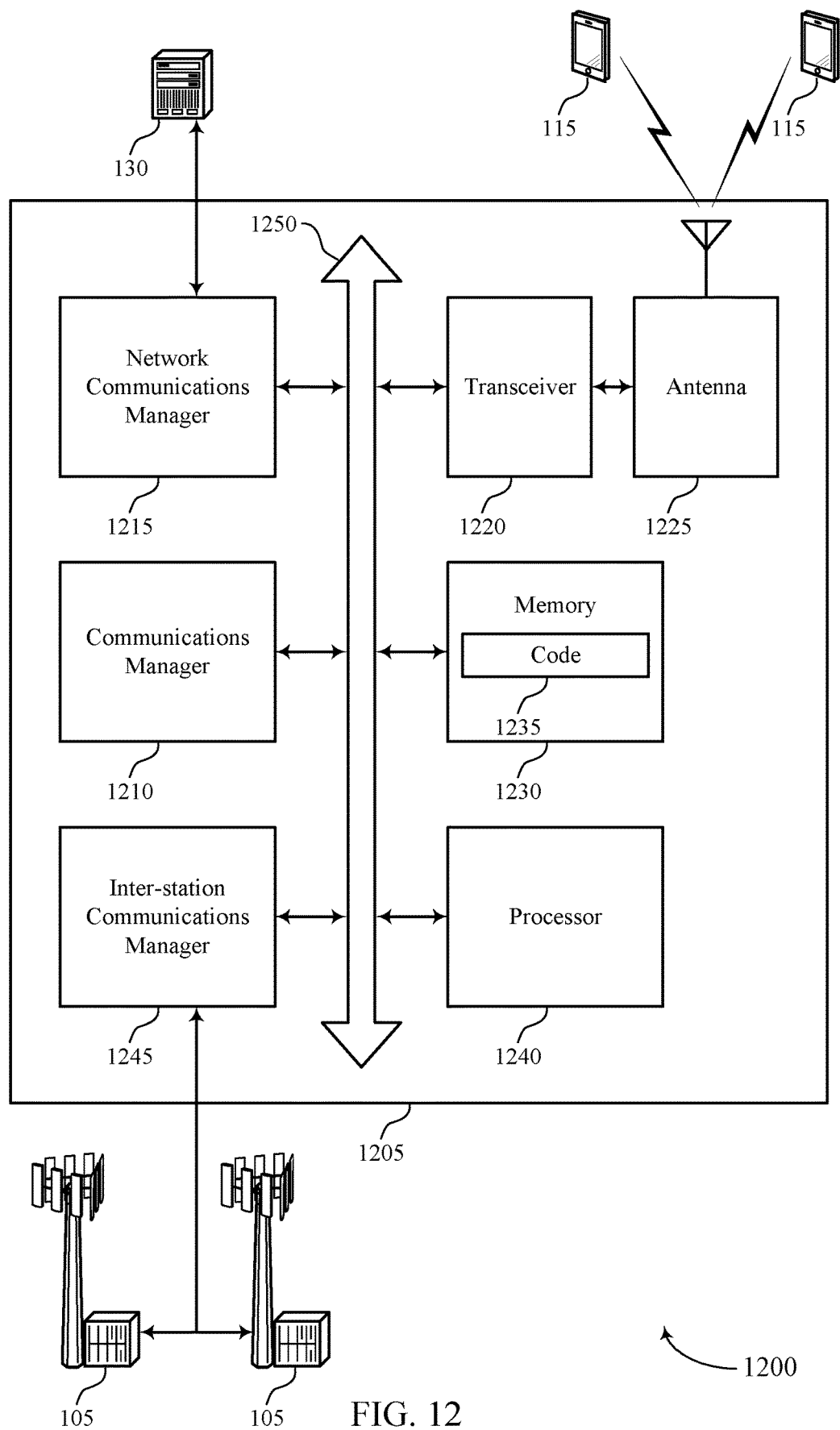
FIG. 12 shows a diagram of a system including a device that supports techniques for beamforming enhancement and feedback in accordance with aspects of the present disclosure.

FIG. 12 shows a diagram of a system 1200 including a device 1205 that supports techniques for beamforming enhancement and feedback in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a report indicating a beam combination parameter that identifies a signal quality corresponding to a combination of a set of beams in a set of beams, determine a dynamic beam including one or more beams of the set of beams based on receiving the report, transmit a beam configuration indicating the dynamic beam, and communicate with the UE via the dynamic beam based on transmitting the beam configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for beamforming enhancement and feedback).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
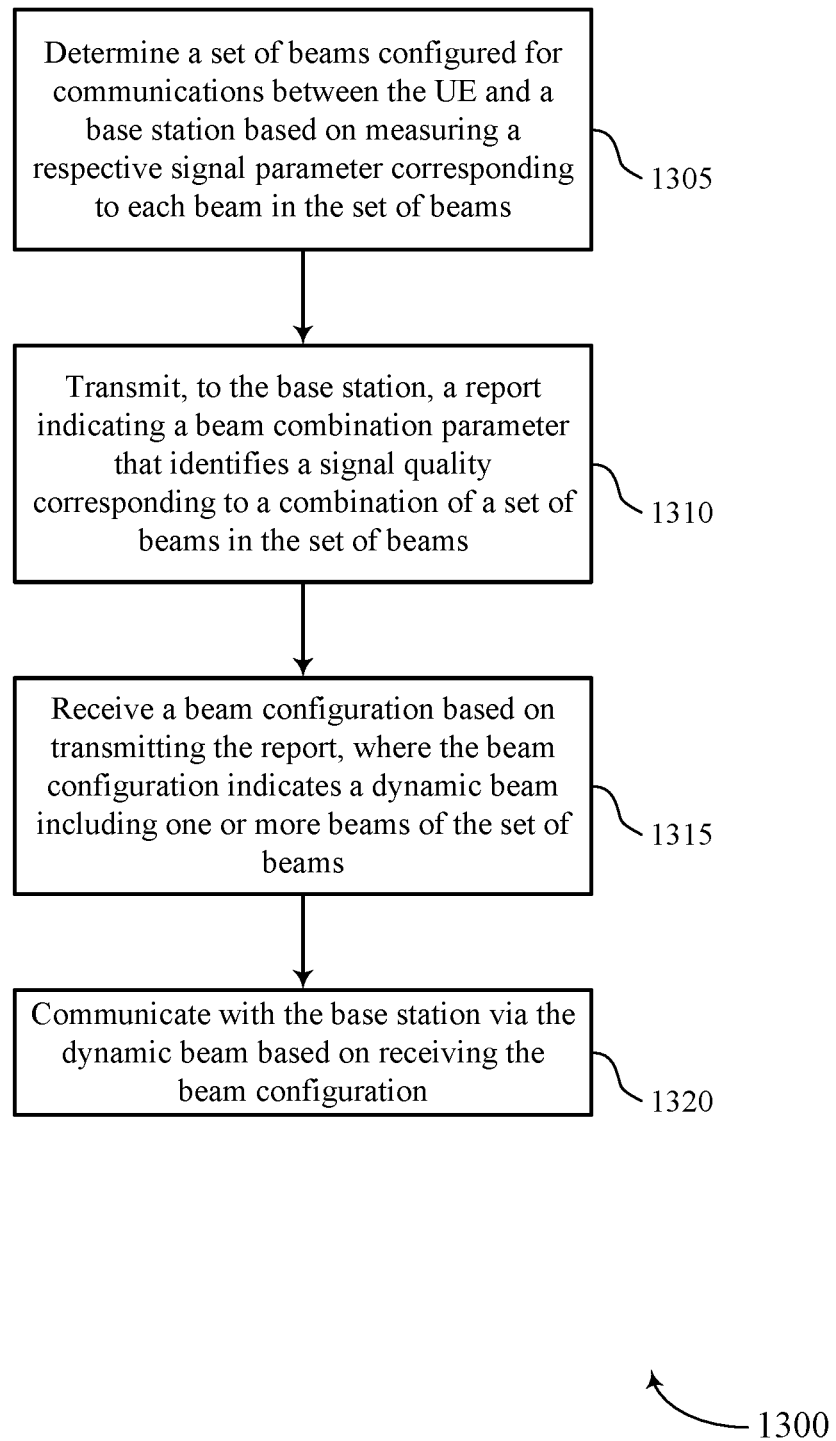
FIGS. 13 through 17 show flowcharts illustrating methods that support techniques for beamforming enhancement and feedback in accordance with aspects of the present disclosure.

FIG. 13 shows a flowchart illustrating a method 1300 that supports techniques for beamforming enhancement and feedback in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine a set of beams configured for communications between the UE and a base station based on measuring a respective signal parameter corresponding to each beam in the set of beams. The operations of 1305 may be performed according to the methods described herein. In some examples, aspects of the operations of 1305 may be performed by a beam measurement manager as described with reference to FIGS. 5 through 8.

At 1310, the UE may transmit, to the base station, a report indicating a beam combination parameter that identifies a signal quality corresponding to a combination of a set of beams in the set of beams. The operations of 1310 may be performed according to the methods described herein. In some examples, aspects of the operations of 1310 may be performed by a reporting manager as described with reference to FIGS. 5 through 8.

At 1315, the UE may receive a beam configuration based on transmitting the report, where the beam configuration indicates a dynamic beam including one or more beams of the set of beams. The operations of 1315 may be performed according to the methods described herein. In some examples, aspects of the operations of 1315 may be performed by a beam configuration component as described with reference to FIGS. 5 through 8.

At 1320, the UE may communicate with the base station via the dynamic beam based on receiving the beam configuration. The operations of 1320 may be performed according to the methods described herein. In some examples, aspects of the operations of 1320 may be performed by a beamforming component as described with reference to FIGS. 5 through 8.

Figure 14:
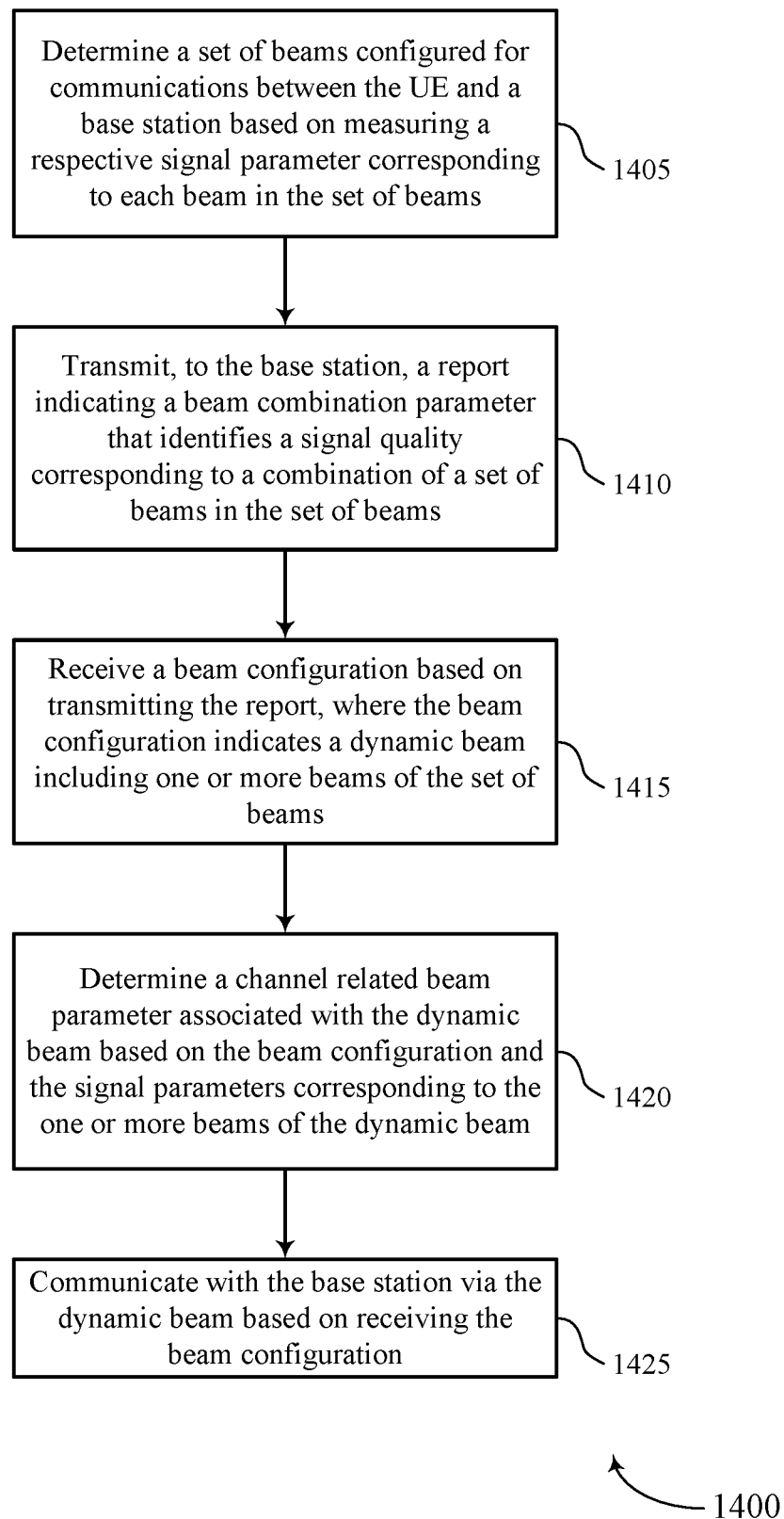

FIG. 14 shows a flowchart illustrating a method 1400 that supports techniques for beamforming enhancement and feedback in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine a set of beams configured for communications between the UE and a base station based on measuring a respective signal parameter corresponding to each beam in the set of beams. The operations of 1405 may be performed according to the methods described herein. In some examples, aspects of the operations of 1405 may be performed by a beam measurement manager as described with reference to FIGS. 5 through 8.

At 1410, the UE may transmit, to the base station, a report indicating a beam combination parameter that identifies a signal quality corresponding to a combination of a set of beams in the set of beams. The operations of 1410 may be performed according to the methods described herein. In some examples, aspects of the operations of 1410 may be performed by a reporting manager as described with reference to FIGS. 5 through 8.

At 1415, the UE may receive a beam configuration based on transmitting the report, where the beam configuration indicates a dynamic beam including one or more beams of the set of beams. The operations of 1415 may be performed according to the methods described herein. In some examples, aspects of the operations of 1415 may be performed by a beam configuration component as described with reference to FIGS. 5 through 8.

At 1420, the UE may determine a channel related beam parameter associated with the dynamic beam based on the beam configuration and the signal parameters corresponding to the one or more beams of the dynamic beam. The operations of 1420 may be performed according to the methods described herein. In some examples, aspects of the operations of 1420 may be performed by a beam parameter manager as described with reference to FIGS. 5 through 8.

At 1425, the UE may communicate with the base station via the dynamic beam based on receiving the beam configuration. The operations of 1425 may be performed according to the methods described herein. In some examples, aspects of the operations of 1425 may be performed by a beamforming component as described with reference to FIGS. 5 through 8.

Figure 15:
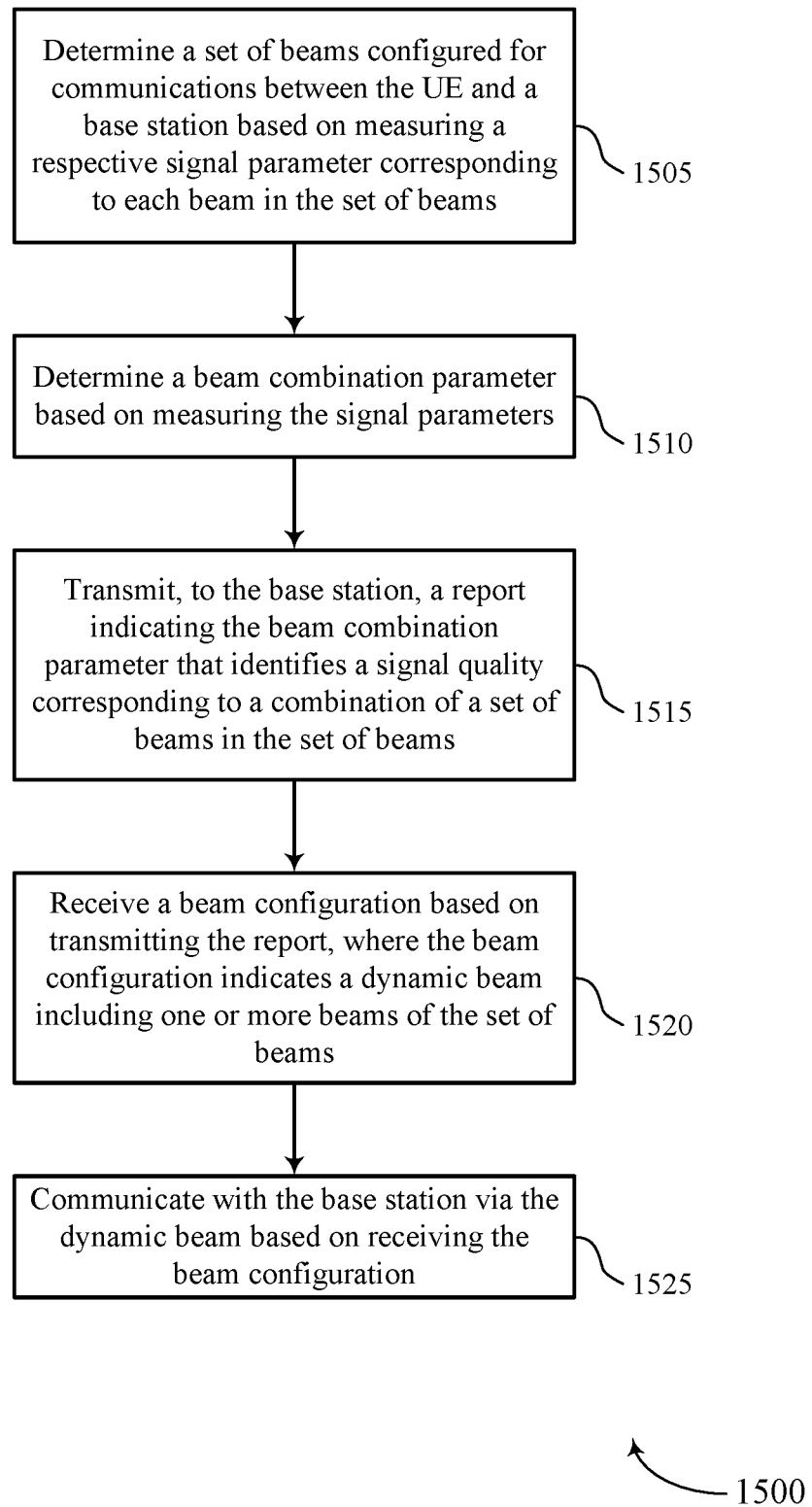

FIG. 15 shows a flowchart illustrating a method 1500 that supports techniques for beamforming enhancement and feedback in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine a set of beams configured for communications between the UE and a base station based on measuring a respective signal parameter corresponding to each beam in the set of beams. The operations of 1505 may be performed according to the methods described herein. In some examples, aspects of the operations of 1505 may be performed by a beam measurement manager as described with reference to FIGS. 5 through 8.

At 1510, the UE may determine the beam combination parameter based on measuring the signal parameters. The operations of 1510 may be performed according to the methods described herein. In some examples, aspects of the operations of 1510 may be performed by a beam combination parameter manager as described with reference to FIGS. 5 through 8.

At 1515, the UE may transmit, to the base station, a report indicating a beam combination parameter that identifies a signal quality corresponding to a combination of a set of beams in the set of beams. The operations of 1515 may be performed according to the methods described herein. In some examples, aspects of the operations of 1515 may be performed by a reporting manager as described with reference to FIGS. 5 through 8.

At 1520, the UE may receive a beam configuration based on transmitting the report, where the beam configuration indicates a dynamic beam including one or more beams of the set of beams. The operations of 1520 may be performed according to the methods described herein. In some examples, aspects of the operations of 1520 may be performed by a beam configuration component as described with reference to FIGS. 5 through 8.

At 1525, the UE may communicate with the base station via the dynamic beam based on receiving the beam configuration. The operations of 1525 may be performed according to the methods described herein. In some examples, aspects of the operations of 1525 may be performed by a beamforming component as described with reference to FIGS. 5 through 8.

Figure 16:
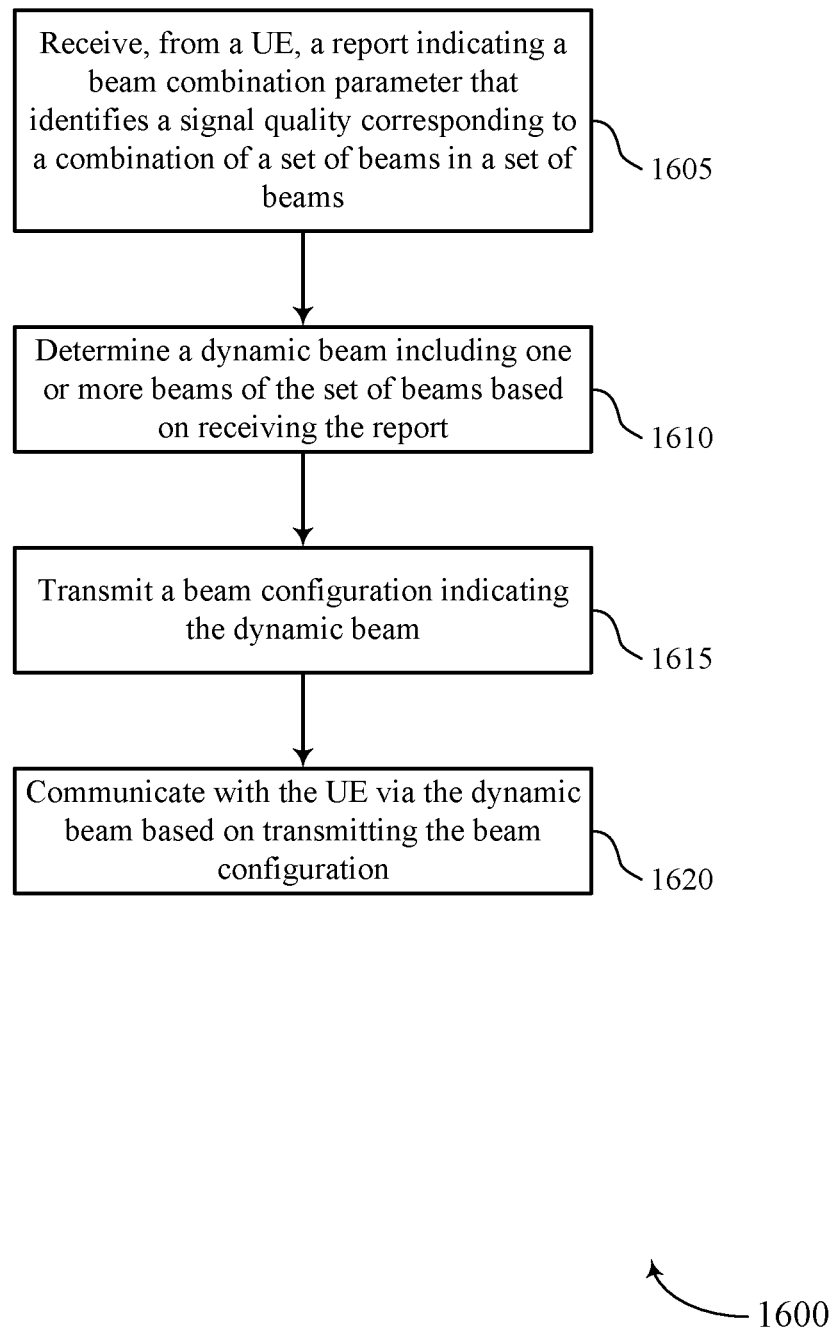

FIG. 16 shows a flowchart illustrating a method 1600 that supports techniques for beamforming enhancement and feedback in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive, from a UE, a report indicating a beam combination parameter that identifies a signal quality corresponding to a combination of a set of beams in a set of beams. The operations of 1605 may be performed according to the methods described herein. In some examples, aspects of the operations of 1605 may be performed by a report component as described with reference to FIGS. 9 through 12.

At 1610, the base station may determine a dynamic beam including one or more beams of the set of beams based on receiving the report. The operations of 1610 may be performed according to the methods described herein. In some examples, aspects of the operations of 1610 may be performed by a dynamic beam manager as described with reference to FIGS. 9 through 12.

At 1615, the base station may transmit a beam configuration indicating the dynamic beam. The operations of 1615 may be performed according to the methods described herein. In some examples, aspects of the operations of 1615 may be performed by a beam configuration manager as described with reference to FIGS. 9 through 12.

At 1620, the base station may communicate with the UE via the dynamic beam based on transmitting the beam configuration. The operations of 1620 may be performed according to the methods described herein. In some examples, aspects of the operations of 1620 may be performed by a beamforming manager as described with reference to FIGS. 9 through 12.

Figure 17:
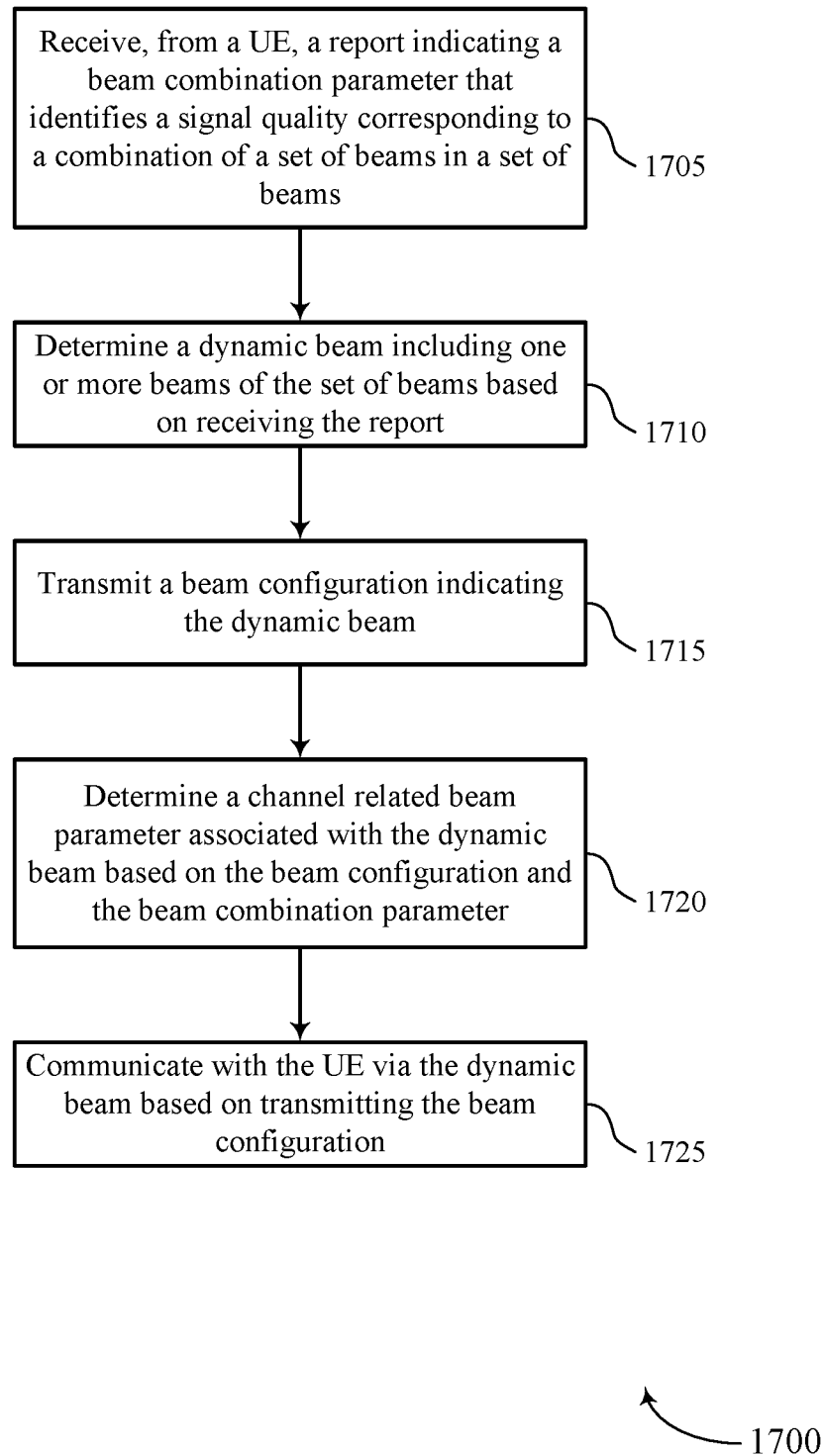

FIG. 17 shows a flowchart illustrating a method 1700 that supports techniques for beamforming enhancement and feedback in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a report indicating a beam combination parameter that identifies a signal quality corresponding to a combination of a set of beams in a set of beams. The operations of 1705 may be performed according to the methods described herein. In some examples, aspects of the operations of 1705 may be performed by a report component as described with reference to FIGS. 9 through 12.

At 1710, the base station may determine a dynamic beam including one or more beams of the set of beams based on receiving the report. The operations of 1710 may be performed according to the methods described herein. In some examples, aspects of the operations of 1710 may be performed by a dynamic beam manager as described with reference to FIGS. 9 through 12.

At 1715, the base station may transmit a beam configuration indicating the dynamic beam. The operations of 1715 may be performed according to the methods described herein. In some examples, aspects of the operations of 1715 may be performed by a beam configuration manager as described with reference to FIGS. 9 through 12.

At 1720, the base station may determine a channel related beam parameter associated with the dynamic beam based on the beam configuration and the beam combination parameter. The operations of 1720 may be performed according to the methods described herein. In some examples, aspects of the operations of 1720 may be performed by a beam parameter component as described with reference to FIGS. 9 through 12.

At 1725, the base station may communicate with the UE via the dynamic beam based on transmitting the beam configuration. The operations of 1725 may be performed according to the methods described herein. In some examples, aspects of the operations of 1725 may be performed by a beamforming manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining a set of beams configured for communications between the UE and a network entity based at least in part on measuring a respective signal parameter corresponding to each beam in the set of beams;
   transmitting, to the network entity, a report indicating a beam combination parameter that identifies a signal quality corresponding to a combination of a plurality of beams in the set of beams, the beam combination parameter comprising a respective angular spread of each beam of the plurality of beams, a respective coverage area of each beam of the plurality of beams, a respective array gain of each beam of the plurality of beams, a respective signal-to-noise ratio gain of each beam of the plurality of beams, a respective panel parameter associated with each beam of the plurality of beams, a respective antenna module parameter associated with each beam of the plurality of beams, or any combination thereof;
   receiving a beam configuration based at least in part on transmitting the report, wherein the beam configuration indicates a dynamic beam generated from a combination of at least two beams of the set of beams; and
   communicating with the network entity via the dynamic beam based at least in part on receiving the beam configuration.

2. The method of claim 1, further comprising:
   determining a channel related beam parameter associated with the dynamic beam based at least in part on the beam configuration and the signal parameters corresponding to the at least two beams of the dynamic beam.

3. The method of claim 2, wherein the channel related beam parameter comprises a power delay profile for the dynamic beam, a timing offset for the dynamic beam, a frequency offset for the dynamic beam, or any combination thereof.

4. The method of claim 1, further comprising:
   determining the beam combination parameter based at least in part on measuring the signal parameters.

5. The method of claim 4, wherein determining the beam combination parameter comprises:
   determining a first beam combination parameter for a first component carrier, a first subband, or both, in a carrier aggregation configuration; and
   determining a second beam combination parameter for a second component carrier, a second subband, or both, in the carrier aggregation configuration.

6. The method of claim 5, wherein the carrier aggregation configuration comprises an inter-band carrier aggregation configuration or an intra-band carrier aggregation configuration.

7. The method of claim 1, wherein:
   the beam configuration comprises a respective indication for each beam of the dynamic beam; and
   the indication identifies a synchronization signal block, a channel state information reference signal, a sounding reference signal, or any combination thereof, for a respective beam.

8. The method of claim 1, wherein the beam combination parameter identifies a respective transmission configuration indication state, a respective channel state information reference signal resource indicator, a respective sounding reference signal resource indicator, or any combination thereof, corresponding to each beam of the plurality of beams.

9. The method of claim 1, wherein the plurality of beams identified in the report comprise the at least two beams that constitute generation of the dynamic beam via a co-phasing of the at least two beams.

10. The method of claim 1, wherein the respective signal parameter corresponding to each beam in the set of beams comprises a reference signal received power, a reference signal received quality, a reference signal strength indicator, a signal to noise ratio, a signal to interference plus noise ratio, or any combination thereof.

11. A method for wireless communications at a network entity, comprising:
    receiving, from a user equipment (UE), a report indicating a beam combination parameter that identifies a signal quality corresponding to a combination of a plurality of beams in a set of beams, the beam combination parameter comprising a respective angular spread of each beam of the plurality of beams, a respective coverage area of each beam of the plurality of beams, a respective array gain of each beam of the plurality of beams, a respective signal-to-noise ratio gain of each beam of the plurality of beams, a respective panel parameter associated with each beam of the plurality of beams, a respective antenna module parameter associated with each beam of the plurality of beams, or any combination thereof;
    determining a dynamic beam generated from a combination of at least two beams of the set of beams based at least in part on receiving the report;
    transmitting a beam configuration indicating the dynamic beam; and
    communicating with the UE via the dynamic beam based at least in part on transmitting the beam configuration.

12. The method of claim 11, further comprising:
    determining a channel related beam parameter associated with the dynamic beam based at least in part on the beam configuration and the beam combination parameter.

13. The method of claim 12, wherein the channel related beam parameter comprises a power delay profile for the dynamic beam, a timing offset for the dynamic beam, a frequency offset for the dynamic beam, or any combination thereof.

14. The method of claim 11, wherein the beam combination parameter comprises a first beam combination parameter for a first component carrier, a first subband, or both, in a carrier aggregation configuration and a second beam combination parameter for a second component carrier, a second subband, or both, in the carrier aggregation configuration.

15. The method of claim 14, wherein the carrier aggregation configuration comprises an inter-band carrier aggregation configuration or an intra-band carrier aggregation configuration.

16. The method of claim 11, wherein:
    the beam configuration comprises a respective indication for each beam of the dynamic beam; and
    the indication identifies a synchronization signal block, a channel state information reference signal, a sounding reference signal, or any combination thereof, for a respective beam.

17. The method of claim 11, wherein the beam combination parameter identifies a respective transmission configuration indication state, a respective channel state information reference signal resource indicator, a respective sounding reference signal resource indicator, or any combination thereof, corresponding to each beam of the plurality of beams.

18. The method of claim 11, wherein the plurality of beams identified in the report comprise the at least two beams that constitute generation of the dynamic beam via a co-phasing of the at least two beams.

19. An apparatus for wireless communications at a user equipment (UE), comprising:
a processor,
memory coupled with the processor; and
instructions stored in the memory and executable by the processor to cause the apparatus to:
determine a set of beams configured for communications between the UE and a network entity based at least in part on measuring a respective signal parameter corresponding to each beam in the set of beams;
transmit, to the network entity, a report indicating a beam combination parameter that identifies a signal quality corresponding to a combination of a plurality of beams in the set of beams, the beam combination parameter comprising a respective angular spread of each beam of the plurality of beams, a respective coverage area of each beam of the plurality of beams, a respective array gain of each beam of the plurality of beams, a respective signal-to-noise ratio gain of each beam of the plurality of beams, a respective panel parameter associated with each beam of the plurality of beams, a respective antenna module parameter associated with each beam of the plurality of beams, or any combination thereof;
receive a beam configuration based at least in part on transmitting the report, wherein the beam configuration indicates a dynamic beam generated from a combination of at least two beams of the set of beams; and
communicate with the network entity via the dynamic beam based at least in part on receiving the beam configuration.

20. The apparatus of claim 19, wherein the instructions are further executable by the processor to cause the apparatus to:
determine a channel related beam parameter associated with the dynamic beam based at least in part on the beam configuration and the signal parameters corresponding to the at least two beams of the dynamic beam.

21. The apparatus of claim 20, wherein the channel related beam parameter comprises a power delay profile for the dynamic beam, a timing offset for the dynamic beam, a frequency offset for the dynamic beam, or any combination thereof.

22. The apparatus of claim 19, wherein the instructions are further executable by the processor to cause the apparatus to:
determine the beam combination parameter based at least in part on measuring the signal parameters.

23. The apparatus of claim 19, wherein the beam combination parameter identifies a respective transmission configuration indication state, a respective channel state information reference signal resource indicator, a respective sounding reference signal resource indicator, or any combination thereof, corresponding to each beam of the plurality of beams.

24. The apparatus of claim 19, wherein the respective signal parameter corresponding to each beam in the set of beams comprises a reference signal received power, a reference signal received quality, a reference signal strength indicator, a signal to noise ratio, a signal to interference plus noise ratio, or any combination thereof.

25. An apparatus for wireless communications at a network entity, comprising:
a processor,
memory coupled with the processor; and
instructions stored in the memory and executable by the processor to cause the apparatus to:
receive, from a user equipment (UE), a report indicating a beam combination parameter that identifies a signal quality corresponding to a combination of a plurality of beams in a set of beams, the beam combination parameter comprising a respective angular spread of each beam of the plurality of beams, a respective coverage area of each beam of the plurality of beams, a respective array gain of each beam of the plurality of beams, a respective signal-to-noise ratio gain of each beam of the plurality of beams, a respective panel parameter associated with each beam of the plurality of beams, a respective antenna module parameter associated with each beam of the plurality of beams, or any combination thereof,
determine a dynamic beam generated from a combination of at least two beams of the set of beams based at least in part on receiving the report;
transmit a beam configuration indicating the dynamic beam; and
communicate with the UE via the dynamic beam based at least in part on transmitting the beam configuration.

26. The apparatus of claim 25, wherein the instructions are further executable by the processor to cause the apparatus to:
determine a channel related beam parameter associated with the dynamic beam based at least in part on the beam configuration and the beam combination parameter.

27. The apparatus of claim 26, wherein the channel related beam parameter comprises a power delay profile for the dynamic beam, a timing offset for the dynamic beam, a frequency offset for the dynamic beam, or any combination thereof.

28. The apparatus of claim 22, wherein the instructions are further executable by the processor to cause the apparatus to:
determine a first beam combination parameter for a first component carrier, a first subband, or both, in a carrier aggregation configuration; and
determine a second beam combination parameter for a second component carrier, a second subband, or both, in the carrier aggregation configuration.

29. The apparatus of claim 28, wherein the carrier aggregation configuration comprises an inter-band carrier aggregation configuration or an intra-band carrier aggregation configuration.

30. The apparatus of claim 19, wherein:
the beam configuration comprises a respective indication for each beam of the dynamic beam; and
the indication identifies a synchronization signal block, a channel state information reference signal, a sounding reference signal, or any combination thereof, for a respective beam.

* * * * *